United States Patent
Hatou et al.

(10) Patent No.: US 8,776,565 B2
(45) Date of Patent: Jul. 15, 2014

(54) EVALUATION METHOD OF RESIDUAL STRESS IN WATER JET PEENING AND METHOD OF EXECUTING WATER JET PEENING

(75) Inventors: Hisamitu Hatou, Hitachi (JP); Noboru Saitou, Kasumigaura (JP); Kouichi Kurosawa, Hitachi (JP); Fujio Yoshikubo, Mito (JP); Yuji Matsui, Hitachinaka (JP); Masashi Fukaya, Kashiwa (JP)

(73) Assignee: Hitachi, Ltd., Tokyo (JP)

( * ) Notice: Subject to any disclaimer, the term of this patent is extended or adjusted under 35 U.S.C. 154(b) by 808 days.

(21) Appl. No.: 13/036,223

(22) Filed: Feb. 28, 2011

(65) Prior Publication Data

US 2011/0232348 A1   Sep. 29, 2011

(30) Foreign Application Priority Data

Mar. 25, 2010   (JP) .................. 2010-069840

(51) Int. Cl.
*C21D 7/06*   (2006.01)
(52) U.S. Cl.
USPC ............................................................ 72/53
(58) Field of Classification Search
USPC ............... 72/53, 710; 29/90.7; 451/38, 39, 40
See application file for complete search history.

(56) References Cited

U.S. PATENT DOCUMENTS

| | | | |
|---|---|---|---|
| 5,305,361 A * | 4/1994 | Enomoto et al. | 72/53 |
| 6,519,991 B2 * | 2/2003 | Hirano et al. | 72/53 |
| 7,716,961 B2 * | 5/2010 | Hatou et al. | 72/53 |

FOREIGN PATENT DOCUMENTS

| | | |
|---|---|---|
| JP | 2008-155345 | 7/2008 |
| JP | 2009-209792 | 9/2009 |

OTHER PUBLICATIONS

Saitou et al., "Development of Water Jet Peening Technique for Reactor Internal Components of Nuclear Power Plant," Jet Flow Engineering, 2003, pgs. 4-12, vol. 20., No. 1.
Fukaya et al., "Development of Water Jet Peening (WJP) (3), Flow Behavior Evaluation in WJP," Japan Society of Mechanical Engineers No. 09-3, M&M 2009 Conference 0S1431, 2009, pp. 333-334.
Hatou et al., "Development of Water Jet Peening (WJP) (4), Residual Stress Improvement Behavior Evaluation in WJP," Japan Society of Mechanical Engineers No. 09-3, M&M 2009 Material & Mechanics Conference 0S1431, 2009, pp. 335-336.

\* cited by examiner

*Primary Examiner* — Teresa M Ekiert
(74) *Attorney, Agent, or Firm* — Antonelli, Terry, Stout & Kraus, LLP.

(57) ABSTRACT

An evaluation method of residual stress in water jet peening includes a step of creating an analytical model including meshes according to a water jet peening (WJP) object, the shape of a nozzle, and an injection distance, a step of inputting WJP execution conditions, a step of calculating the internal pressure $p_{Bi}$ of a cavitation bubble and a bubble number density $n_{gi}$ through jet flow analysis for a jet flow jetting from the nozzle, a step of calculating cavitation energy according to the internal pressure $p_{Bi}$ of a cavitation bubble and a bubble number density $n_{gi}$ (S4), a step of calculating the burst energy of cavitation bubbles from the cavitation energy C, and a step of calculating the compressive residual stress of the WJP object from the collapse pressure of cavitation bubbles. Accordingly, the residual stress of the WJP object can be evaluated precisely in a shorter time.

11 Claims, 16 Drawing Sheets

FIG. 23

| SET COMBINATIONS OF INJECTION DISTANCE AND INJECTION ANGLE ||||||
|---|---|---|---|---|---|
| INJECTION DISTANCE (mm) | INJECTION ANGLE (°) |||||
| 50 | 10 | 30 | 50 | 70 | 90 |
| 100 | 10 | 30 | 50 | 70 | 90 |
| 150 | 10 | 30 | 50 | 70 | 90 |
| 200 | 10 | 30 | 50 | 70 | 90 |
| 250 | 10 | 30 | 50 | 70 | 90 |
| 300 | 10 | 30 | 50 | 70 | 90 |

| EVALUATION OF RESIDUAL STRESS IN COMBINATIONS OF INJECTION DISTANCE AND INJECTION ANGLE ||||||
|---|---|---|---|---|---|
| INJECTION DISTANCE (mm) | INJECTION ANGLE (°) |||||
| 50 | 10 | 30 | 50 | 70 | 90 |
| 100 | 10 | 30 | 50 | 70 | 90 |
| 150 | 10 | 30 | 50 | 70 | 90 |
| 200 | 10 | 30 | 50 | 70 | 90 |
| 250 | 10 | 30 | 50 | 70 | 90 |
| 300 | 10 | 30 | 50 | 70 | 90 |

R1, R2

SELECT COMBINATION OF INJECTION DISTANCE AND INJECTION ANGLE THAT BRINGS LARGE EFFECT IN STRESS IMPROVEMENT
(SELECT INJECTION DISTANCE OF 150mm AND INJECTION ANGLE OF 90°)

EVALUATION METHOD OF RESIDUAL STRESS IN WATER JET PEENING AND METHOD OF EXECUTING WATER JET PEENING

CLAIM OF PRIORITY

The present application claims priority from Japanese Patent application serial no. 2010-69840, filed on Mar. 25, 2010, the content of which is hereby incorporated by reference into this application.

BACKGROUND OF THE INVENTION

1. Technical Field

The present invention relates to an evaluation method of residual stress in water jet peening and a method of executing a water jet peening, and more particularly to a evaluation method of residual stress in water jet peening and a method of executing water jet peening suitable for applying to water jet peening executed in a boiling water reactor.

2. Background Art

In boiling water nuclear plants and pressurized water nuclear plants, stress corrosion cracks in a reactor internal, which is a structure member, are suppressed by executing, for example, water jet peening to convert tensile residual stress generated in the reactor internal during welding or machining to compressive residual stress. Water jet peening (hereinafter, referred to as WJP) is a technology to convert tensile residual stress generated in a surface of the reactor internal to compressive residual stress by applying WJP to the surface. In this WJP, water under high pressure is jetted from a nozzle in water to the surface of the reactor internal in a state in which the surface on which the WJP is executed is in contact with the water. When fine bubbles (cavitation bubbles) included in the jetted high-pressure water are collapsed, impulse waves are generated. The generated impulse waves impinge on the surface and the tensile residual stress generated in the surface is then converted to compressive residual stress (see "Noboru Saito et al., Development of Water Jet Peening Technology for Nuclear Plants and Incore Devices, Jet Flow Engineering, Vol. 20, No. 1 (2003), pp. 4-12, Water Jet Technology Society of Japan").

Some technologies to evaluate residual stress generated in a structure member on which WJP was executed (compressive residual stress, for example) are also proposed.

Japanese Patent Laid-open No. 2009-209792 describes a method of predicting erosion generated by cavitation on an internal flow path of a hydraulic machine. In this method, a piezoelectric device is provided on an inner surface of an internal flow path of an actual hydraulic machine (or a hydraulic machine model), and a light emitting device, which converts a voltage signal generated by the piezoelectric device to light, is provided at a predetermined position on the hydraulic machine. When cavitation is generated, the light emitting device emits light. The generated light is measured to predict an area of the internal flow path over which erosion occurs and to predict the amount of erosion.

Japanese Patent Laid-open No. 2008-155345 describes a method of evaluating residual stress on a surface to which water jet peening was executed. In this residual stress evaluation method, a whole area of water jet peening traces generated per unit area on a surface on which WJP was executed is measured, the whole peening trace area is substituted into a relational expression between the residual stress and the whole peening trace area, and the residual stress on the surface on which WJP was executed is evaluated according to the obtained calculation result.

In "Noboru Saito et al., Development of Water Jet Peening Technology for Nuclear Plants and Internal Equipments, Jet Flow Engineering, Vol. 20, No. 1 (2003), pp. 4-12, Water Jet Technology Society of Japan", residual stress is measured by an X-ray diffraction method to evaluate an effect of WJP executed on a structure member.

In "Masashi Fukaya et al., Development of Water Jet Peening (WJP) (3), Flow Behavior Evaluation in WJP, Japan Society of Mechanical Engineers No. 09-3, M&M 2009 Conference 0S1431, Jul. 24 to 26, 2009, pp. 333-334", the internal pressure $p_B$ of a cavitation bubble is calculated from equations (1) to (4) (see page 333) through jet flow analysis, and the calculated bubble's internal pressure $p_B$ is substituted into equation (5) (see page 333) to calculate cavitation strength I. In the paper written by Masashi Fukaya et al., the cavitation strength I is also used to predict compressive residual stress generated in a SUS plate after WJP execution.

In "Hisamitsu Hatou et al., Development of Water Jet Peening (WJP) (4), Residual Stress Improvement Behavior Evaluation in WJP), Japan Society of Mechanical Engineers No. 09-3, M&M 2009 Material & Mechanics Conference 2009, CD-ROM Transactions, 0S1431, Jul. 24 to 26, 2009, pp. 335-336" as well, a method of evaluating residual stress in the depth direction after WJP execution is described. In this evaluation method, residual stress in a depth direction after WJP execution is evaluated according to collapse pressure of cavitation.

CITATION LIST

Patent Literature

Patent literature 1: Japanese Patent Laid-open No. 2009-209792

Patent literature 2: Japanese Patent Laid-open No. 2008-155345

Non-Patent Literature

Non-patent literature 1: Noboru Saito et al., Development of Water Jet Peening Technology for Nuclear Plants and Internal Equipments, Jet Flow Engineering, Vol. 20, No. 1 (2003), pp. 4-12, Water Jet Technology Society of Japan Non-patent literature 2: Masashi Fukaya et al., Development of Water Jet Peening (WJP) (3), Flow Behavior Evaluation in WJP, Japan Society of Mechanical Engineers No. 09-3, M&M 2009 Conference 0S1431, Jul. 24 to 26, 2009, pp. 333-334

Non-patent literature 3: Hisamitsu Hatou et al., Development of Water Jet Peening (WJP) (4), Residual Stress Improvement Behavior Evaluation in WJP), Japan Society of Mechanical Engineers No. 09-3, M&M 2009 Material & Mechanics Conference 2009, CD-ROM Transactions, 0S1431, Jul. 24 to 26, 2009, pp. 335-336

SUMMARY OF THE INVENTION

Technical Problem

In WJP execution in which a nozzle for jetting a jet flow is moved, as described in Japanese Patent Laid-open No. 2009-209792, it is not practical to place a piezoelectric device and light emitting device on a WJP object and measure light emitted by the light emitting device. In residual stress measurement by an X-ray diffraction method as described in "Noboru Saito et al., Development of Water Jet Peening Technology for Nuclear Plants and Internal Equipments, Jet Flow Engineering, Vol. 20, No. 1 (2003), pp. 4-12, Water Jet Technology Society of Japan", the measurement method can be applied when WJP is executed on a test piece, but cannot be easily applied to a structural body of a plant such as a nuclear plant.

There is no peening trace unless WJP is executed on a WJP object. Therefore, the residual stress evaluation method described in Japanese Patent Laid-open No. 2008-155345 cannot predict residual stress unless WJP is executed.

In jet flow analysis described in "Masashi Fukaya et al., Development of Water Jet Peening (WJP) (3), Flow Behavior Evaluation in WJP, Japan Society of Mechanical Engineers No. 09-3, M&M 2009 Conference 0S1431, Jul. 24 to 26, 2009, pp. 333-334", since a jet flow jetted from a nozzle is handled in WJP, it is possible to precisely analyze the behavior of the jet flow and bubbles included in the jet flow. In particular, pressure in a bubble and a bubble number density can be precisely calculated. The accuracy of cavitation strength I calculated by using the bubble's internal pressure and bubble number density is also high. When the residual stress of a WJP object after WJP execution is evaluated, however, it is necessary to evaluate not only residual stress on the surface of the WJP object but also residual stress of the WJP object in a depth direction from the surface of the WJP object. In "Masashi Fukaya et al., Development of Water Jet Peening (WJP) (3), Flow Behavior Evaluation in WJP, Japan Society of Mechanical Engineers No. 09-3, M&M 2009 Conference 0S1431, Jul. 24 to 26, 2009, pp. 333-334", evaluation of residual stress in a depth direction from the surface of the WJP object is not described at all. It is difficult to infer residual stress in a depth direction from the surface of a WJP object according to cavitation strength I.

In the residual stress evaluation method described in "Masashi Fukaya et al., Development of Water Jet Peening (WJP) (3), Flow Behavior Evaluation in WJP, Japan Society of Mechanical Engineers No. 09-3, M&M 2009 Conference 0S1431, Jul. 24 to 26, 2009, pp. 333-334", in which the cavitation strength I obtained by using the jet flow analysis result is considered, a correlation between the cavitation strength I and the measured compressive residual stress generated on the surface of a WJP object becomes strong in a range in which $r/R_n$ is greater than 1.3 in a radial direction from a center of the jet flow jetted from the nozzle during WJP execution, as shown in FIG. 5 and Section 3-2 on page 334 entitled "cavitation strength distribution and compressive residual stress distribution". In the range in which $r/R_n$ is less than or equal to 1.3, that is, near the center of the jet flow on the surface of the WJP object, however, there is a large difference between the cavitation strength I and the measured compressive residual stress generated on the surface of the WJP object. This indicates that when the compressive residual stress generated on the surface of the WJP object is evaluated near the center of the jet flow based on the cavitation strength I, evaluation accuracy of the residual stress is lowered.

In "Hisamitsu Hatou et al., Development of Water Jet Peening (WJP) (4), Residual Stress Improvement Behavior Evaluation in WJP), Japan Society of Mechanical Engineers No. 09-3, M&M 2009 Material & Mechanics Conference 2009, CD-ROM Transactions, 0S1431, Jul. 24 to 26, 2009, pp. 335-336", the residual stress of a WJP object in the depth direction from the surface is obtained by using an axially symmetrical model centered around a Z-axis (axis in the depth direction), restraining from flexibility of the Z-axis and varying collapse pressure of the cavitation. The analysis result of the residual stress in the depth direction is shown in FIG. 4 of this paper.

If the cavitation collapse pressure can be obtained, the residual stress can be obtained in the depth direction from the surface of a WJP object, based on the analysis described in the paper written by Hisamitsu Hatou et al. However, it is not easy to obtain the cavitation collapse pressure generated during WJP. A method of analyzing this collapse pressure is not yet established.

An object of the present invention is to provide an evaluation method of residual stress in water jet peening and a method of executing a water jet peening that can evaluate residual stress of a water jet peening object in a short time and improve accuracy of the evaluated residual stress.

Solution to Problem

The feature of the present invention for attaining the above object is an evaluation method of residual stress in water jet peening having a first step of calculating internal pressure of a bubble, included in a jet flow jetting from a nozzle used for water jet peening, and a bubble number density through jet flow analysis in which the jet flow is analyzed according to water jet peening execution conditions; a second step of calculating cavitation energy based on the internal pressure of the bubble and the bubble number density; a third step of calculating collapse pressure of the bubble based on the cavitation energy; and a fourth step of calculating the residual stress of a water jet peening object, on which to execute water jet peening, based on the collapse pressure of bubbles.

Since the internal pressure of the bubble and bubble number density are calculated through the jet flow analysis, the accuracy of the calculated internal pressure of the bubble and bubble number density is improved. The collapse pressure of bubbles that has been difficult to calculate in the past can be calculated in a short time because the cavitation energy is calculated by using the bubble's internal pressure and bubble number density and then, the collapse pressure of the bubble is calculated based on the obtained cavitation energy. The accuracy of the calculated collapse pressure of bubbles can be also improved. Since the calculated collapse pressure of bubbles is used for stress analysis, the accuracy of the calculated compressive residual stress of a WJP object, can be improved. Thus, the accuracy of the calculated residual stress can be improved. The present invention can evaluate the residual stress of a water jet peening object in a short time and improve the accuracy of the obtained residual stress.

The above object can also be achieved by a method of executing a water jet peening having a first step of calculating internal pressure of a bubble included in a jet flow jetting from a nozzle used for water jet peening and a bubble number density before water jet peening is executed for a water jet peening object, through jet flow analysis in which the jet flow is analyzed with different values of water jet peening execution conditions; a second step of calculating cavitation energy based on the internal pressure of the bubble and bubble number density; a third step of calculating collapse pressure of the bubble based on the cavitation energy; a fourth step of calculating the residual stress of the water jet peening object before water jet peening is applied, based on the collapse pressure of the bubble; a fifth step of deciding whether the calculated residual stress at a set depth from a surface of the water jet peening object is compressive residual stress; a sixth step of storing, in a memory, values of the water jet peening execution conditions used to calculate the residual stress selected and then input, among the residual stress being compressive residual stress at the set depth and extracted in the decision in the fifth step; a seventh step of inputting the values of the water jet peening execution conditions stored in the memory to a control apparatus for a water jet peening apparatus that executes water jet peening for the water jet peening object; and an eighth step of controlling the water jet peening apparatus based on the values of the water jet peening execution conditions by the control apparatus.

Advantageous Effect of the Invention

According to the present invention, the residual stress of a water jet peening object can be evaluated in a short time and the accuracy of the obtained residual stress can be improved.

BRIEF DESCRIPTION OF THE DRAWINGS

FIG. 23 is a flowchart showing detailed processing shown in step S6 in FIG. 22.

DETAILED DESCRIPTION OF THE PREFERRED EMBODIMENTS

Figure 1:
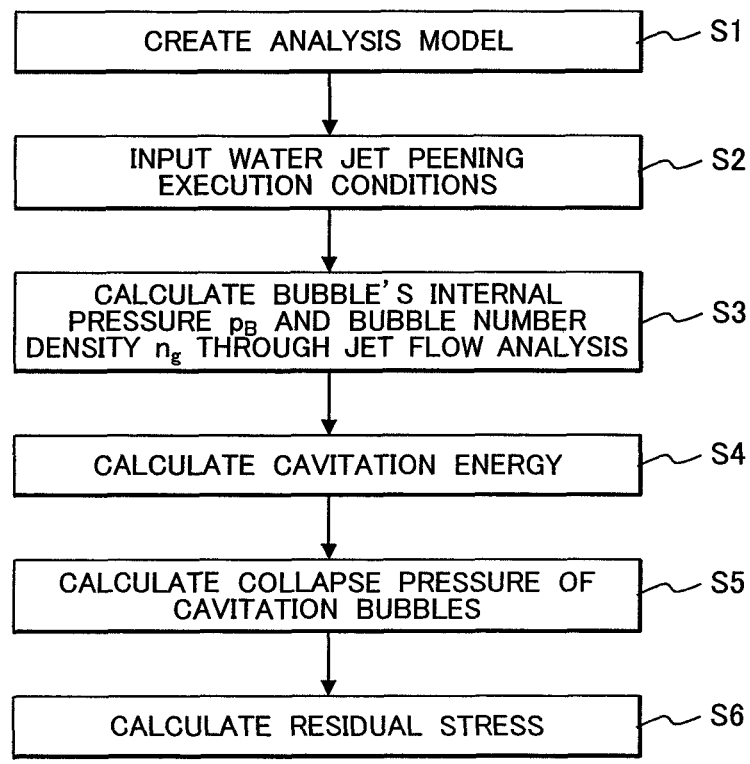
FIG. 1 is a flowchart showing processing in an evaluation method of residual stress in water jet peening according to embodiment 1 which is a preferred embodiment of the present invention.

The inventors have made various studies for a residual stress evaluation method in water jet peening (WJP) that can evaluate residual stress of a WJP object with improved precision in a short time. The results of the studies will be described below.

Since the behavior of a jet flow generated during WJP and bubbles included in the jet flow can be accurately analyzed in jet flow analysis, the inventors thought to apply the jet flow analysis to an evaluation method of residual stress in WJP. In this jet flow analysis, a numerical analysis was used to calculate and predict behavior of bubbles in a field in which a jet flow jetted from a nozzle into water flows, as described in (A) to (D) below. An example of the jet flow analysis used here is described on page 333 of "Masashi Fukaya et al., Development of Water Jet Peening (WJP) (3), Flow Behavior Evaluation in WJP, Japan Society of Mechanical Engineers No. 09-3, M&M 2009 Conference 0S1431, Jul. 24 to 26, 2009".

(A) The velocity and pressures of a jet flow jetted from a nozzle and of a liquid present around a WJP object are calculated by using an equation that describes motion of a fluid (Navier-Stokes equation, for example). (B) The translation motion of cavitation bubbles in the flow field is assumed to be the same as the motion of the fluid (their slip velocity is 0). Alternatively, the translation motion is calculated by using a motion equation in which the balance of forces exerted on the bubble (added inertial force, force caused by accelerated peripheral fluid, lifting force, and drag force, for example) is formulated. (C) A scalar transport equation in which the bubble number density $n_g$ (the number of bubbles per unit volume) is used as a variable is solved according to the translation motion of the bubble to calculate a spatial distribution of the number of bubbles. (D) The expansion and contraction motion of the cavitation bubbles is calculated by using a motion equation in which a relationship between the bubble's internal pressure $p_B$ and pressure $p_L$ of a fluid around bubbles is formulated (Rayleigh-Plesset equation, for example).

Next, The cavitation energy C exerted on the surface of the WJP object is calculated by using the bubble's internal pressure $p_B$ and bubble number density $n_g$ obtained in jet flow analysis. It is generally known that the cavitation energy C is proportional to the square of bubble impact pressure. The cavitation energy C (J) exerted on the surface of the WJP object in a predetermined time and taken into consideration a spatial distribution of the number of bubbles, can be obtained from equation (1).

$$C = k_1 \sum_V \sum_i p_{ci}^2 n_g \Delta V \quad (1)$$

In the equation (1), $p_{ci}$ is bubble impact pressure of each bubble, $\Delta V$ is a volume of an analytical grid including the cavitation bubbles that caused the bubble impact pressure $p_{ci}$, V is a volume in an evaluated space, and $k_1$ is a constant.

When the bubble impact pressure $p_{ci}$ is typified by of the internal pressure $p_{Bi}$ of a cavitation bubble, the cavitation energy C (J) can be obtained from equation (2).

$$C = k_2 \sum_V \sum_i p_{Bi}^2 n_g \Delta V \quad (2)$$

In equation (2), $k_2$ is a constant and $\Delta V$ is a volume of an analytical grid including the cavitation bubbles with the internal pressure $p_B$.

Since the bubble's internal pressure $p_B$ can be easily obtained from the Rayleigh-Plesset equation, the inventors used equation (2) to calculate the cavitation energy C.

To improve the residual stress of a WJP object, it is necessary to have the WJP object undergo plastic deformation. Therefore, if it is assumed that when the bubble's internal pressure $p_{Bi}$ exceeds a threshold $p_{Bth}$, the WJP object undergoes plastic deformation, then it suffices to solve equation (2) only when the bubble's internal pressure $p_{Bi}$ exceeds the threshold $p_{Bth}$.

The inventors measured the residual stress on the surfaces of WJP objects after WJP was executed by an X-ray diffraction method. Flat-plate test pieces made of austenitic stainless steel (SUS304-based steel and SUS316-based steel) and Ni-base alloys (Alloy 600, Alloy 182, and Alloy 82) were used as WJP objects. Eight types of nozzles with different shapes (different orifices, for example) were used to jet high-pressure jet flows. WJP was executed to each of the above test pieces by using the eight nozzles at injection distances from 15 mm to 150 mm under injection pressures of 10 MPa to 70 MPa; injection time was varied from 20 min/m to 40 min/m. Each nozzle was disposed with its axial center orthogonal to the surface of the test piece so that the injection angle of the jet flow becomes 90° to the surface of the test piece. The residual stress on the surface of each test piece was measured with the X-ray diffraction method by changing WJP conditions.

Figure 9:
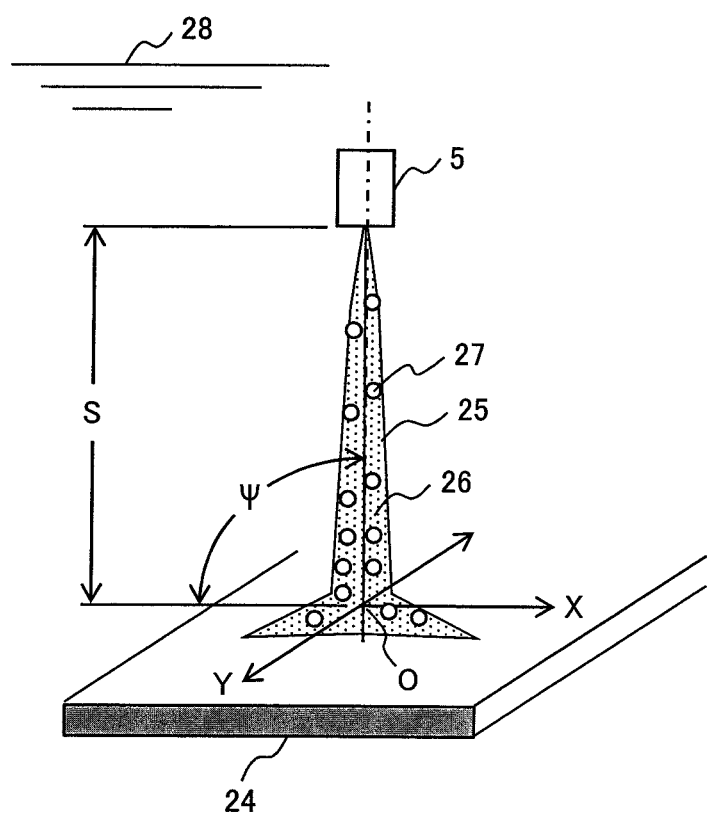
FIG. 9 an explanatory drawing showing a jet flow jetting from a nozzle apparatus during execution of water jet peening.

The essential of the method of executing WJP to the above test pieces will be described by referred to FIG. 9. A test piece 24 is placed in water 28 supplied in a water tank (not shown). High-pressure water 26 pressurized by a high-pressure pump (not shown) is supplied to a nozzle 5 disposed orthogonal to the surface of the test piece 24. The high-pressure water 26 is jetted into the water 28 from an injection outlet (bore of 2 mm) of the nozzle 5 toward the surface of the test piece 24, as a jet flow 25. Cavitation bubbles 27 are generated in a process in which the high-pressure water 26 is jetted from the nozzle 5. The jet flow 25 includes many cavitation bubbles 27. When these cavitation bubbles 27 are collapsed, a collapse pressure is generated and exerted on the test piece 24, and plastically deforms the vicinity of the surface of the test piece 24. When the plastic deformation portion of the test piece 24 is compressed by surrounding elastic constraint, the tensile residual stress of the test piece 24 is improved to compressive residual stress. In FIG. 9, S is a distance between the top of the nozzle 5 and the surface of the test piece 24, that is, an injection distance (stand-off distance), and W is an angle (injection angle) formed by a center of the jet flow 25 (an extension line of an axial center of the nozzle 5) and the surface of the test piece 24. O shown in FIG. 9 is the center of the jet flow 25 on the surface of the test piece 24 (WJP object). The center is the intersection of the extension line of the axial center of the nozzle 5 and the surface of the WJP object. Time during which the high-pressure water 26 is jetted from the nozzle 5 is referred to as injection time. The X-axis and Y-axis orthogonal to the X-axis in FIG. 9 are respectively represented by X and Y. When WJP is executed to the test piece 24, the nozzle 5 moves along the Y-axis, so the center O of the jet flow 25 also moves in the Y direction and WJP is executed along the Y-axis.

The residual stress of each test piece 24 on which WJP was executed as described above was measured in an X-ray diffraction method.

The cavitation energy C in cases in which WJP was executed on each test piece 24 was obtained by substituting, into equation (2), the bubble's internal pressure $p_B$ and bubble number density $n_g$ obtained through the jet flow analysis described above in which various jet conditions were used differently in each of the cases.

Figure 10:
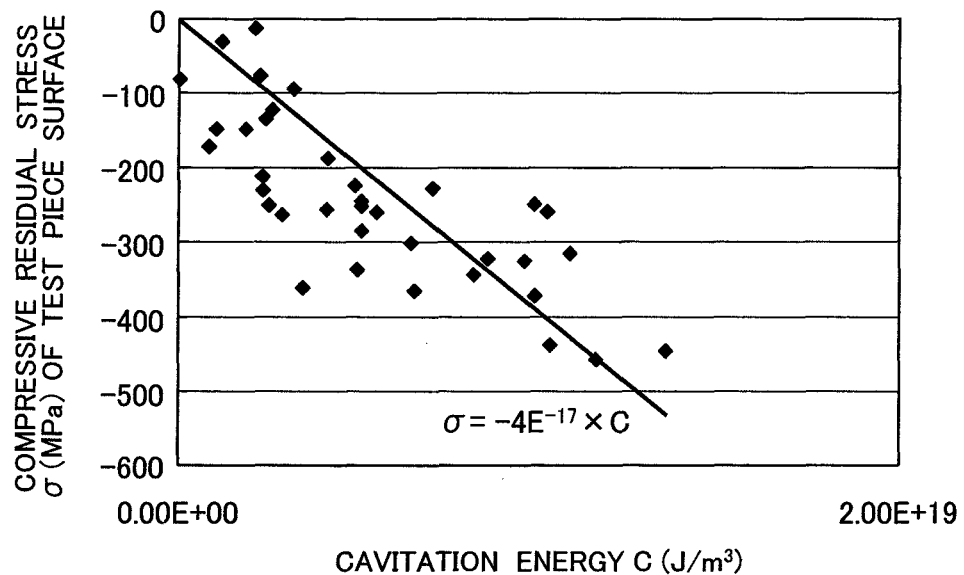
FIG. 10 is a characteristic diagram showing a relationship between cavitation energy and compressive residual stress on a surface of a test piece surface.

The inventors compiled the residual stress of the test pieces 24 measured by the X-ray diffraction method and the cavitation energy C for the test pieces 24 obtained from equation (2) under the various jet conditions in the cases, and could obtain a correlation between the residual stress of the test pieces 24 and the cavitation energy C for the test pieces 24 as shown in FIG. 10. The correlation shown in FIG. 10 indicates that the larger the cavitation energy C is, the larger the value of compressive residual stress σ measured by the X-ray diffraction method. The cavitation energy C ($J/m^3$) and the compressive residual stress σ (MPa) measured by the X-ray diffraction method could be approximated by equation (3).

$$\sigma = -4E^{-17} \times C \quad (3)$$

Next, the inventors analyzed the residual stress on the surface of the test piece by using the collapse pressure of cavitation bubbles generated in WJP as a parameter, and considered a correlation between the collapse pressure of cavitation bubbles and the residual stress on the surface of the test piece. The inventors analyzed the residual stress on the surface of the test piece through dynamic elasto-plastic analysis based on a finite-element method. The test pieces that are analyzed objects are flat plates made of austenitic stainless steel (SUS304-based steel and SUS316-based steel) and Ni-base alloys (Alloy 600, Alloy 182, and Alloy 82) as in the case of the above test pieces on which WJP was executed.

The residual stress on the surfaces of the test pieces made of SUS304 was analyzed by using an axially symmetrical model in which the collapse pressure of cavitation bubbles was varied in the range of 0 GPa to 2 GPa, as described in "Hisamitsu Hatou et al., Development of Water Jet Peening (WJP) (4), Residual Stress Improvement Behavior Evaluation in WJP), Japan Society of Mechanical Engineers No. 09-3, M&M 2009 Material & Mechanics Conference 2009, CD-ROM Transactions, 0S1431, Jul. 24 to 26, 2009, pp. 335-336". A time taken to increase the collapse pressure of cavitation bubbles, used as a parameter, from 0 GPa to 2 GPa was set to 1 μS, a time taken to reduce the collapse pressure of cavitation bubbles from 2 GPa to 0 GPa was set to 1 μS, the diameter of an average peening trace was set to 0.25 mm, Young's modulus of the test piece was set to 195 GPa, the yield stress of the test piece was set to 600 MPa, and the work hardening coefficient of the test piece was set to 1.95 GPa. In residual stress analysis for test pieces made of materials other than SUS304, the values of the Young's modulus, yield stress, and work hardening coefficient of the pertinent materials were replaced with values of the pertinent material.

Figure 11:
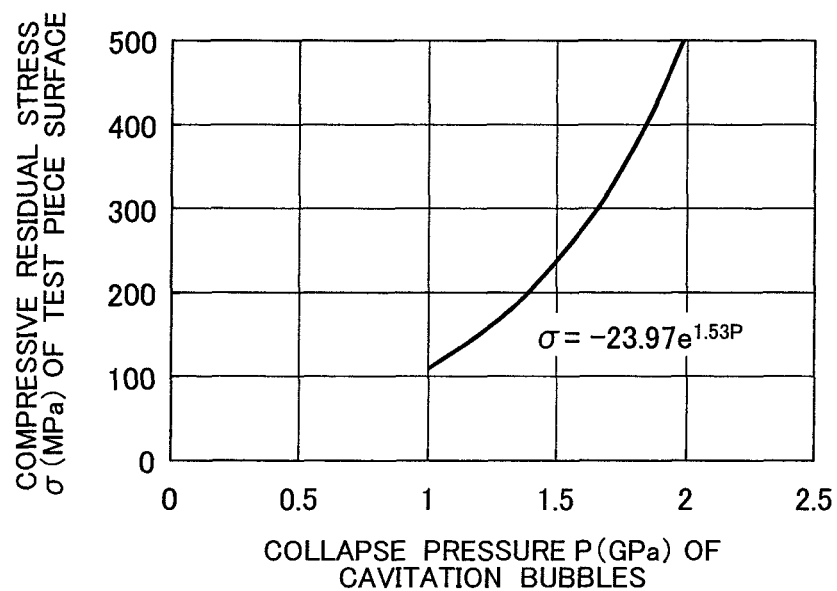
FIG. 11 is a characteristic diagram showing a relationship between collapse pressure of cavitation bubbles and compressive residual stress on a surface of a test piece surface.

FIG. 11 shows a correlation between the collapse pressure of cavitation bubbles, used as a parameter, and the analyzed value of the compressive residual stress on the surface of the test piece, which was obtained in the residual stress analysis carried out under the conditions described above. The correlation shown in FIG. 11 indicates that the larger the collapse pressure P (GPa) of cavitation bubbles is, the larger the analyzed value of the compressive residual stress σ (MPa) on the surface of the test piece. This correlation could be approximated by equation (4).

$$\sigma = -23.91 e^{1.53P} \quad (4)$$

The inventors found a new finding that the collapse pressure P of cavitation bubbles can be obtained based on the cavitation energy C by mutually relating the compressive residual stress (measured value) on the surface of the test piece, which is shown on the vertical axis in FIG. 10, and the compressive residual stress (analyzed value) on the surface of the test piece, which is shown on the vertical axis in FIG. 11. Specifically, the collapse pressure P of cavitation bubbles can be obtained by substituting the compressive residual stress σ obtained by equation (3) into equation (4). The collapse pressure P of cavitation bubbles have been difficult to obtain in the past, but it can be easily obtained by using the cavitation energy C obtained by substituting the bubble's internal pressure $p_B$ and bubble number density $n_g$, which are obtained in jet flow analysis, into equation (2).

Figure 12:
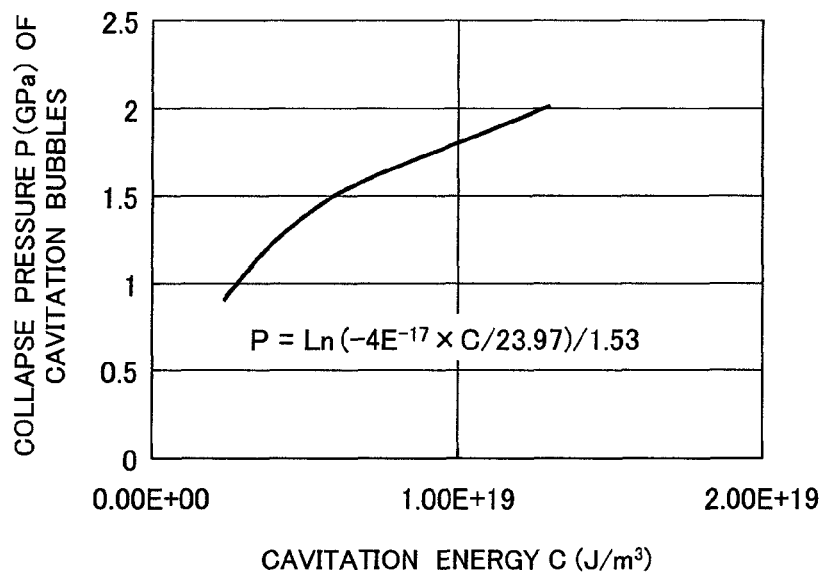
FIG. 12 is a characteristic diagram showing a relationship between cavitation energy and collapse pressure of cavitation bubbles.

The collapse pressure P of cavitation bubbles can be obtained from equation (5), which is obtained from equations (3) and (4) (see FIG. 12).

$$P = Ln(-4E^{-17} \times C/23.97)/1.53 \quad (5)$$

Equation (5) indicates that the collapse pressure P of cavitation bubbles can be obtained by using the cavitation energy C. If collapse pressure P of cavitation bubbles can be obtained, the residual stress in the depth direction can be obtained from the test piece surface by applying the obtained collapse pressure P of cavitation bubbles to the analytical method, using an axially symmetrical model, described in "Hisamitsu Hatou et al., Development of Water Jet Peening (WJP) (4), Residual Stress Improvement Behavior Evaluation in WJP), Japan Society of Mechanical Engineers No. 09-3, M&M 2009 Material & Mechanics Conference 2009, CD-ROM Transactions, 0S1431, Jul. 24 to 26, 2009, pp. 335-336".

Then, the inventors obtained the residual stress of the WJP object on which WJP had been executed, by using WJP execution conditions under which to evaluate the WJP object, as described below. The bubble's internal pressure $p_B$ and bubble number density $n_g$ were calculated through jet flow analysis using the WJP execution conditions. These calculated values are substituted into equation (2) to obtain the cavitation energy C, and the obtained cavitation energy C was substituted into equation (5) to obtain the collapse pressure P of cavitation bubbles. By using the obtained collapse pressure P of cavitation bubbles, the residual stress of the test piece described above, which is a WJP object, was calculated through the analytical method in which an axially symmetrical model was used, the model being described in "Hisamitsu Hatou et al., Development of Water Jet Peening (WJP) (4), Residual Stress Improvement Behavior Evaluation in WJP), Japan Society of Mechanical Engineers No. 09-3, M&M 2009 Material & Mechanics Conference 2009, CD-ROM Transactions, 0S1431, Jul. 24 to 26, 2009, pp. 335-336".

The inventors considered the residual stress (analyzed values) of the test pieces obtained by the above jet flow analysis, calculations with equations (2) and (5), and stress analysis (stress analysis based on, for example, the analytical method described in "Hisamitsu Hatou et al., Development of Water Jet Peening (WJP) (4), Residual Stress Improvement Behavior Evaluation in WJP), Japan Society of Mechanical Engineers No. 09-3, M&M 2009 Material & Mechanics Conference 2009, CD-ROM Transactions, 0S1431, Jul. 24 to 26, 2009, pp. 335-336") and also considered the residual stress (measured values) obtained by measuring the test pieces on which WJP was executed by the X-ray diffraction method. The residual stress evaluation method of evaluating the residual stress of the WJP object on which WJP was executed through the jet flow analysis, calculations with equations (2) and (5), and stress analysis (based on, for example, the analytical method described in "Hisamitsu Hatou et al., Development of Water Jet Peening (WJP) (4), Residual Stress Improvement Behavior Evaluation in WJP), Japan Society of Mechanical Engineers No. 09-3, M&M 2009 Material & Mechanics Conference 2009, CD-ROM Transactions, 0S1431, Jul. 24 to 26, 2009, pp. 335-336") is the new residual stress evaluation method worked out by the inventors.

In study of the analyzed values and measured values of residual stress, the inventors executed WJP on test pieces under the following WJP execution conditions, as shown in FIG. 9, to measure residual stress. Flat plates made of SUS316L were used as test pieces on which to execute WJP. The injection outlet of the nozzle for jetting a jet flow was 2 mm in bore. The WJP execution conditions were as follows: the injection distance S was 140 mm, the flow rate of high-pressure water jetted from the nozzle was 48 L/min, the injection angle Ψ was 90°, and the injection time of the high-pressure water was 40 min/m (indicating that WJP was executed for 40 min/m). These WJP execution conditions were also used in jet flow analysis and stress analysis in the new residual stress evaluation method worked out by the inventors.

Figure 13:
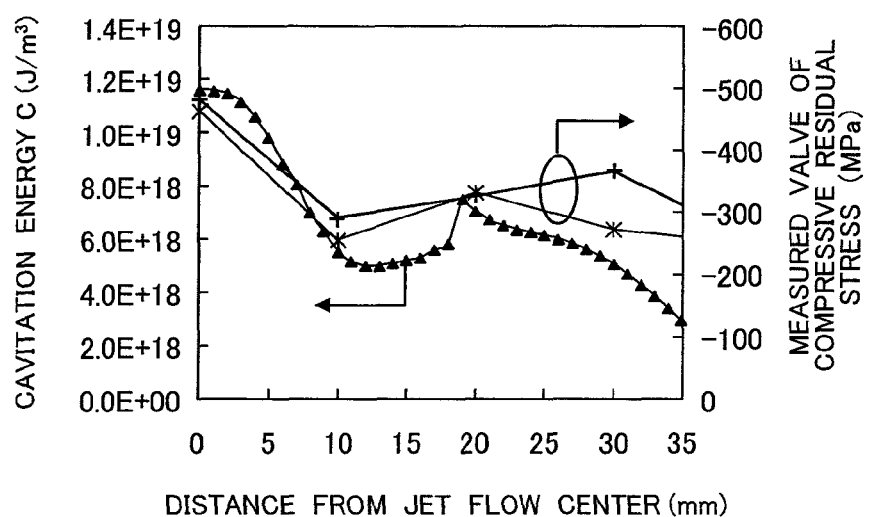
FIG. 13 is a characteristic diagram showing a relationship a distance from a center of a jet flow and each of cavitation energy and compressive residual stress on a surface of a test piece.

FIG. 13 shows cavitation energy C obtained from equation (2) by carrying out jet flow analysis under the above WJP execution conditions, and also shows measured values of compressive residual stress obtained by using the X-ray diffraction method to measure the surfaces of test pieces on which WJP was executed under these execution conditions. The distance from the center of the jet flow, which is shown in the horizontal axis, indicates the distance from the center O of the jet flow on the surface of the test piece in the X-axis direction orthogonal to the Y-axis along which the nozzle 5 moves. The two characteristics of the markings + and × shown in FIG. 13 indicate the measured values of compressive residual stress obtained by measuring two test pieces. The triangles in FIG. 13 indicate the cavitation energy C.

The inventors selected four positions, which were apart from the center O of the jet flow by 0 mm, 10 mm, 20 mm, and 30 mm, as typical examples, and substituted cavitation energy C (see FIG. 13) obtained from equation (2) at these positions into equation (5) to calculate the collapse pressure P of cavitation bubbles. Table 1 shows the collapse pressure P of cavitation bubbles obtained at the four positions as well as cavitation energy C used in the calculation of the collapse pressure P of cavitation bubbles.

TABLE 1

| Distance from the center of the jet flow (mm) | Cavitation energy C (J/m³) | collapsing energy of cavitation bubbles (GPa) |
|---|---|---|
| 0 | 1.16E+19 | 1.93 |
| 10 | 5.51E+18 | 1.45 |
| 20 | 7.04E+18 | 1.61 |
| 30 | 5.05E+18 | 1.39 |

The inventors further obtained residual stress of the test pieces on which WJP were executed at the above four positions by using each value of collapse pressure P of cavitation bubbles shown in Table 1 through dynamic elasto-plastic analysis based on a finite element method. The residual stress was also calculated at positions in the depth direction from the surface of the test piece. In the analysis of this residual stress, the conditions used in the residual stress analysis in which analyzed values (shown in FIG. 11) of the compressive residual stress of the surface of the test piece were obtained were used. Even though SUS316L has the same values of the Young's modulus, yield stress, and work hardening coefficient as SUS304, the values of SUS304 were used. The measured residual stress values of the test piece on which WJP was executed were obtained at positions in the depth direction by repeating a process of electrically polishing the test piece to a depth at which to measure residual stress and then measuring residual stress by the X-ray diffraction method so that the test piece is not distorted during machining.

Figure 14:
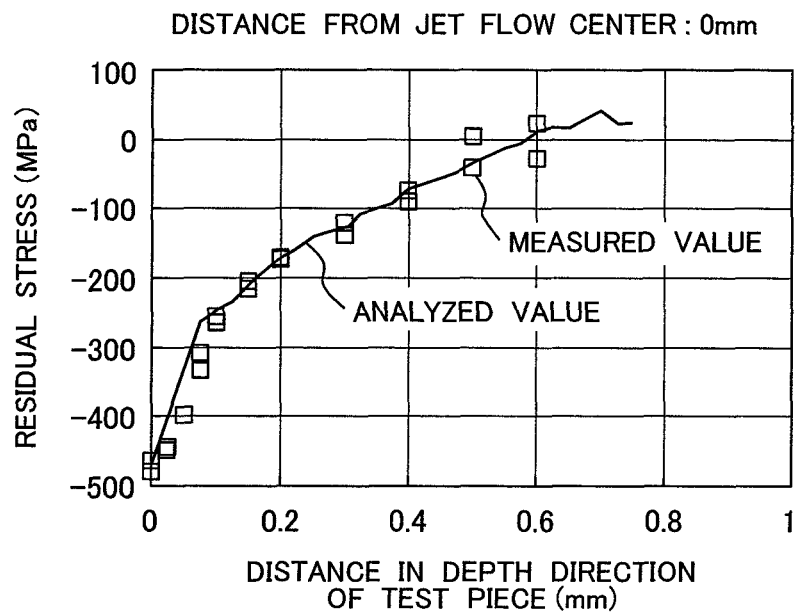
FIG. 14 is a characteristic diagram showing a distribution of residual stress in a depth direction of a test piece at a distance of 0 mm from a center of a jet flow.
Figure 15:
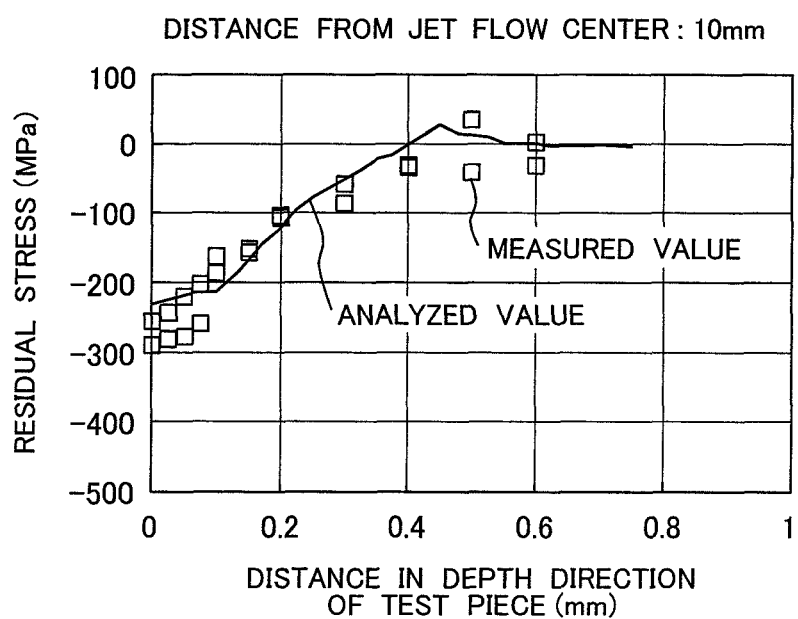
FIG. 15 is a characteristic diagram showing distribution of residual stress in a depth direction of a test piece at a distance of 10 mm from a center of a jet flow.
Figure 16:
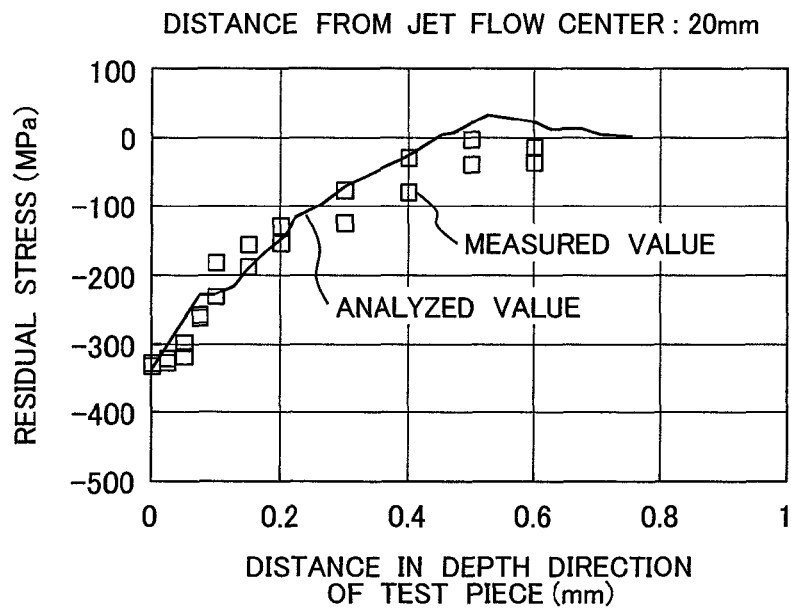
FIG. 16 is a characteristic diagram showing a distribution of residual stress in a depth direction of a test piece at a distance of 20 mm from a center of a jet flow.
Figure 17:
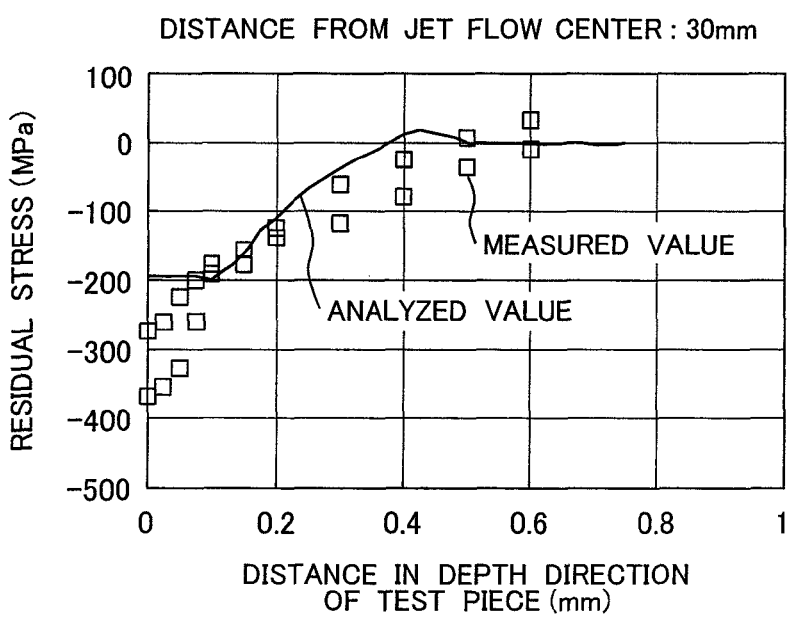
FIG. 17 is a characteristic diagram showing a distribution of residual stress in a depth direction of a test piece at a distance of 30 mm from a center of a jet flow.
Figure 18:
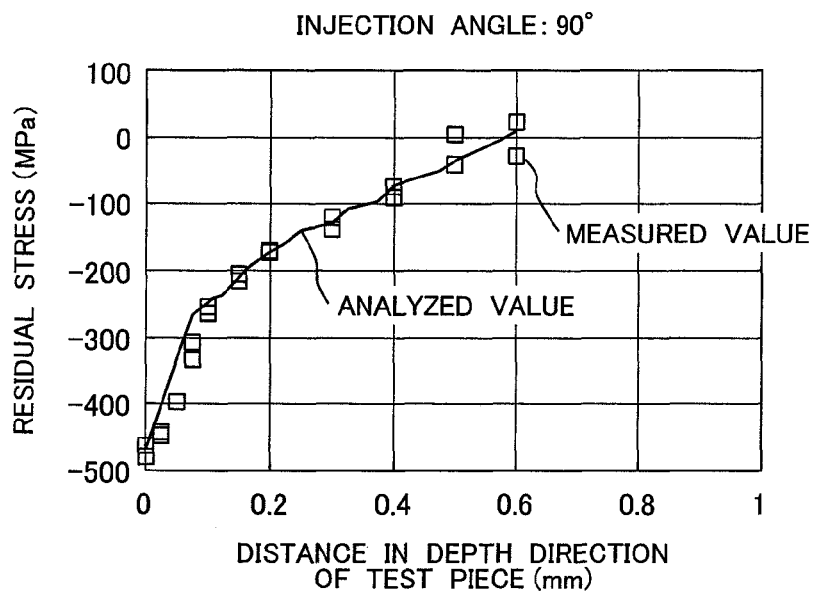
FIG. 18 is a characteristic diagram showing a distribution of residual stress in a depth direction of a test piece when an injection angle is 90°.
Figure 19:
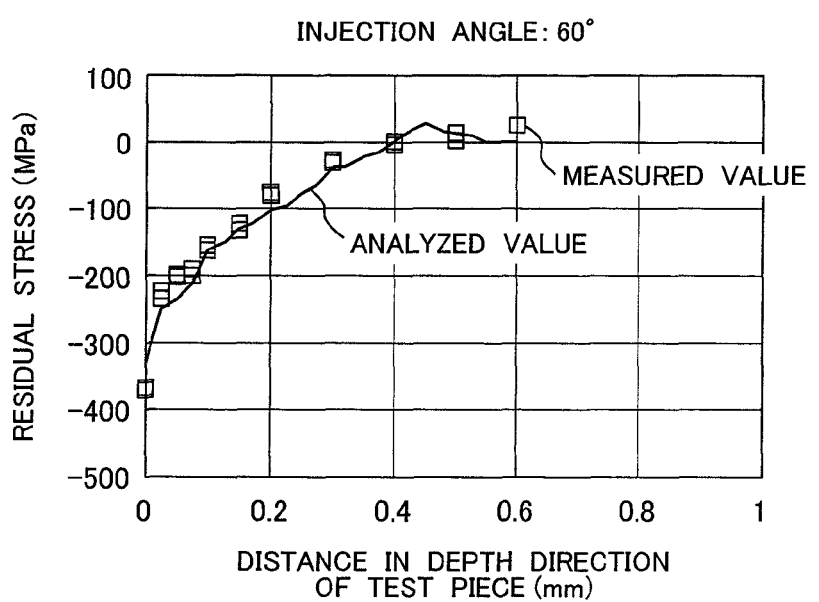
FIG. 19 is a characteristic diagram showing a distribution of residual stress in a depth direction of a test piece when an injection angle is 60°.
Figure 20:
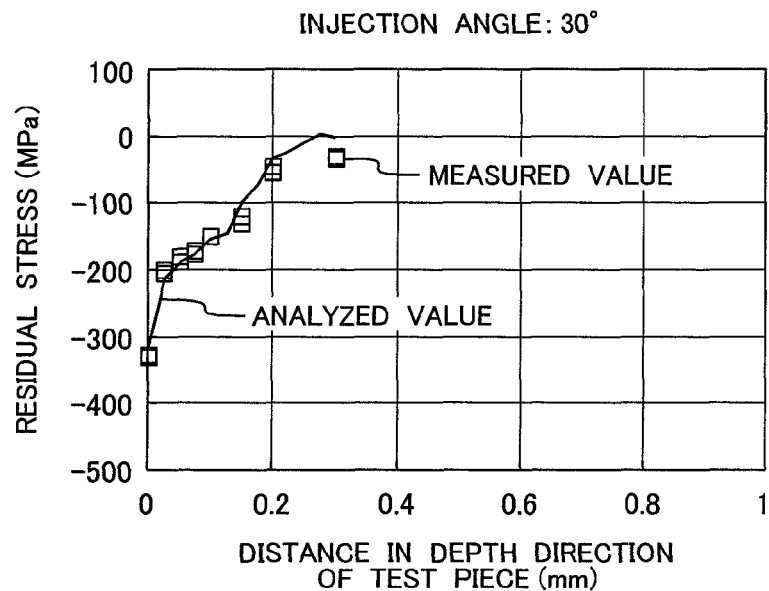
FIG. 20 is a characteristic diagram showing distribution of residual stress in a depth direction of a test piece when an injection angle is 30°.
Figure 21:
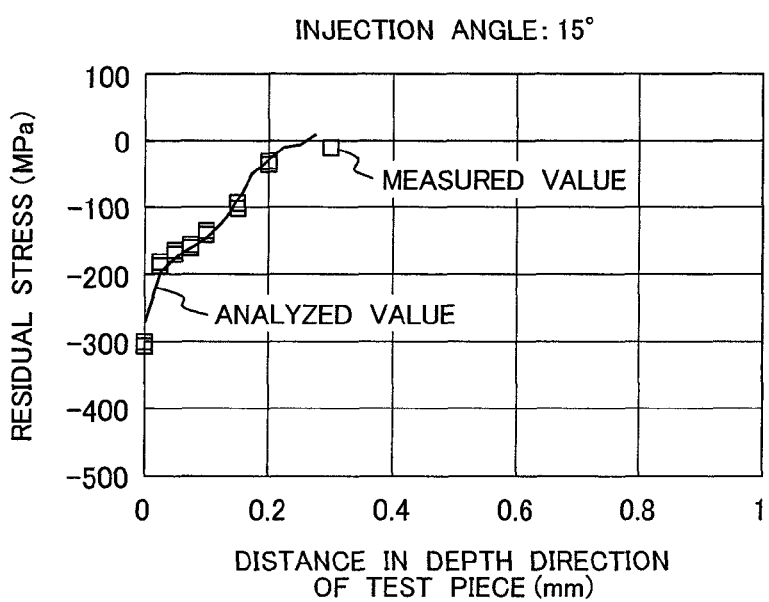
FIG. 21 is a characteristic diagram showing a distribution of residual stress in a depth direction of a test piece when an injection angle is 15°.

FIG. 14 shows the measured values and analyzed values of residual stress at a distance of 0 mm from the center of the jet flow. FIG. 15 shows the measured values and analyzed values of residual stress at a distance of 10 mm from the center of the jet flow. FIG. 16 shows the measured values and analyzed values of residual stress at a distance of 20 mm from the center of the jet flow. FIG. 17 shows the measured values and analyzed values of residual stress at a distance of 30 mm from the center of the jet flow. These drawings also show residual stress at a plurality of positions in the depth direction from the surface of the test piece. In FIGS. 14 to 17, the measured residual stress values are indicated by squares, and the analyzed values of residual stress, which were obtained by using cavitation energy C in Table 1, are indicated by a solid line. As shown in FIG. 14, the measured values and analyzed values of residual stress at the center of the jet flow match well in the depth direction from the test piece surface as well.

Accordingly, the new residual stress evaluation method worked out by the inventors, which is used after WJP execution, was shown to be usable in evaluation of residual stress on the surfaces of WJP objects on which WJP was executed and of their internal residual stress.

From the above study results, the inventors further worked out anew residual stress evaluation method in WJP in which the bubble's internal pressure $p_B$ is obtained through jet flow analysis, cavitation energy is calculated based on the obtained bubble's internal pressure $p_B$ (specifically, calculated from equation (2)), the collapse pressure of cavitation bubbles is calculated based on the cavitation energy (specifically, calculated from equation (5)), and the residual stress of the WJP object is obtained based on the collapse pressure of cavitation bubbles.

The analyzed residual stress values in proximity to the center O of the jet flow (an area with a radius of 30 mm, centered around the center O of the jet flow) shown in FIGS. 14 to 17 were obtained by using the new residual stress evaluation method in WJP. These analyzed values match their corresponding measured residual stress values. When the new residual stress evaluation method in WJP is used, therefore, the evaluation accuracy of residual stress of the WJP object in proximity to the center O of the jet flow (an area with a radius of 30 mm, centered around the center O of the jet flow) becomes higher than in the evaluation method with the cavitation strength I taken into consideration, which is described in "Masashi Fukaya et al., Development of Water Jet Peening (WJP) (3), Flow Behavior Evaluation in WJP, Japan Society of Mechanical Engineers N 09-3, M&M 2009 Conference 0S1431, Jul. 24 to 26, 2009, pp. 333-334".

The new residual stress evaluation method in WJP can be used not only to evaluate the residual stress of a WJP object on which WJP was executed but also to predict residual stress that WJP will cause on a WJP object to which WJP will be executed, the prediction being carried out before WJP is executed, and to determine WJP execution conditions according to the obtained residual stress.

Then, the inventors studied selection of WJP execution conditions used when a WJP object undergoes WJP, by using the injection angle $\Psi$ as an example, which is one WJP execution condition. The study results will be described below.

In this study, residual stress was measured for four cases in which the injection angle $\Psi$ was set to 90°, 60°, 30°, and 15°, and analyzed values of residual stress were obtained. In these cases, the measured values and analyzed values of residual stress were obtained in proximity to the center of the jet flow to reflect the results in the four cases shown in FIGS. 14 to 17 in which the distance from the center of the jet flow, described above, is changed. The analyzed values of residual stress are obtained by using the new residual stress evaluation method in WJP, described above.

The execution of WJP on test pieces in the four cases in which the injection angle $\Psi$ was set to 90°, 60°, 30°, and 15° is executed under the same conditions as when the measured values of residual stress shown in FIGS. 14 to 17 were obtained. In each of the four cases, the analyzed values of residual stress caused on WJP objects by executing WJP were calculated by using the new residual stress evaluation method in WJP, under the same conditions as when the analyzed values of residual stress shown in FIGS. 14 to 17 were obtained. In measurement of residual stress at positions in the depth direction of the test pieces on which WJP was executed in the four cases in which the injection angle $\Psi$ was varied, the measured values of residual stress were obtained by repeating a process of electrically polishing the test piece and then measurement of residual stress by an X-ray diffraction method as in FIGS. 14 to 17.

FIGS. 18 to 21 show the measured values of residual stress with squares and the analyzed values of residual stress with a solid line, with the injection angle $\Psi$ of the jet flow set to 90°, 60°, 30°, and 15°, respectively. The measured values and analyzed values shown in FIG. 18 were obtained when the jet angle $\Psi$ was 90°. The measured values and analyzed values shown in FIG. 19 were obtained when the jet angle $\Psi$ was 60°. The measured values and analyzed values shown in FIG. 20 were obtained when the jet angle $\Psi$ was 30°. The measured values and analyzed values shown in FIG. 21 were obtained when the jet angle $\Psi$ was 15°. The measured values and analyzed values of residual stress shown in FIGS. 18 to 21 were obtained at positions in the depth direction from the test piece surface.

In the cases as well in which the injection angle $\Psi$ of the jet flow was set to 90°, 60°, 30°, and 15°, there was a good match in the depth direction from the surface of the test piece between the measured values of residual stress and analyzed values of residual stress in proximity to the center of the jet flow. FIGS. 18 to 21 indicate that the closer to 90° the injection angle is, the more adequate the compressive residual stress is on the surface of the test piece (WJP object) and in the depth direction from the surface.

The inventors could be found a new findings that when the residual stress of a WJP object on which WJP was executed is obtained in advance by using the above new residual stress evaluation method in WJP, WJP execution conditions can be selected based on the residual stress obtained in advance. It is also possible to select WJP execution conditions other than the injection angle Ψ, that is, the shape of the nozzle 5 (the bore of the injection outlet, for example), the injection distance S, the injection flow rate, and the injection time, and the like according to the residual stress obtained by the new residual stress evaluation method in WJP.

Embodiments of the present invention that the study results described above are reflected will be described below.

First Embodiment

An evaluation method of residual stress in water jet peening according to embodiment 1 which is a preferred embodiment of the present invention, will be described by referred to FIGS. 1 to 3.

In the present embodiment, residual stress of a water jet peening (WJP) object on which WJP object was executed is evaluated. A water jet peening apparatus (hereinafter, referred to as WJP apparatus) used to execute the WJP for the WJP object and the WJP execution performed by using the WJP apparatus will be described with reference to FIGS. 4 to 8.

Figure 4:
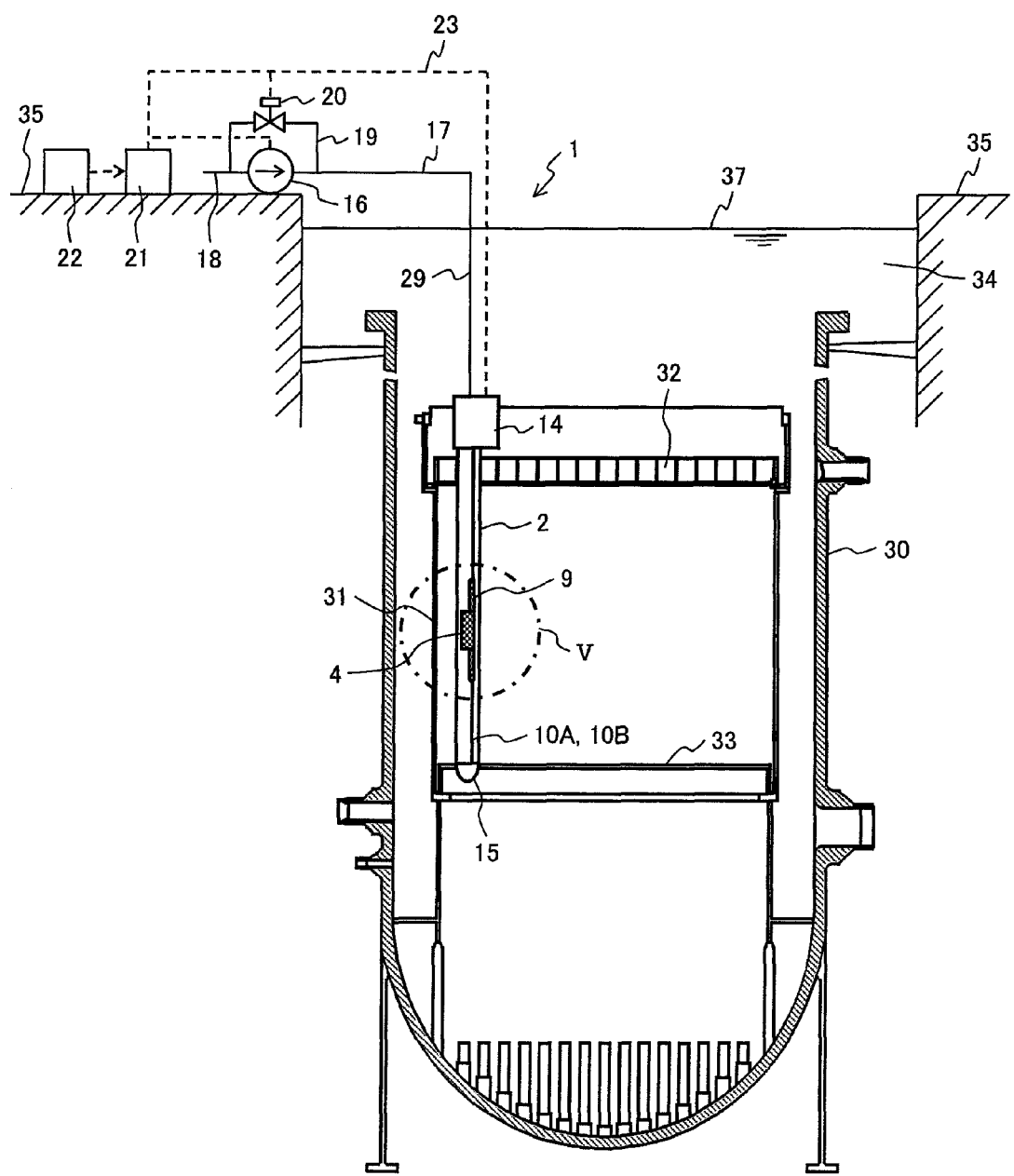
FIG. 4 is an explanatory drawing showing a state in which a water jet peening apparatus is placed in a reactor pressure vessel of a boiling water reactor.
Figure 6:
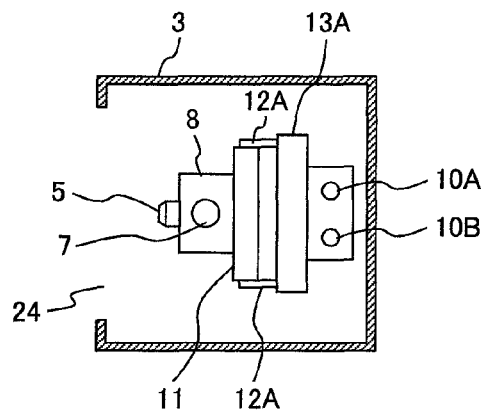
FIG. 6 is a sectional view taken along a line VI-VI of FIG. 5.
Figure 7:
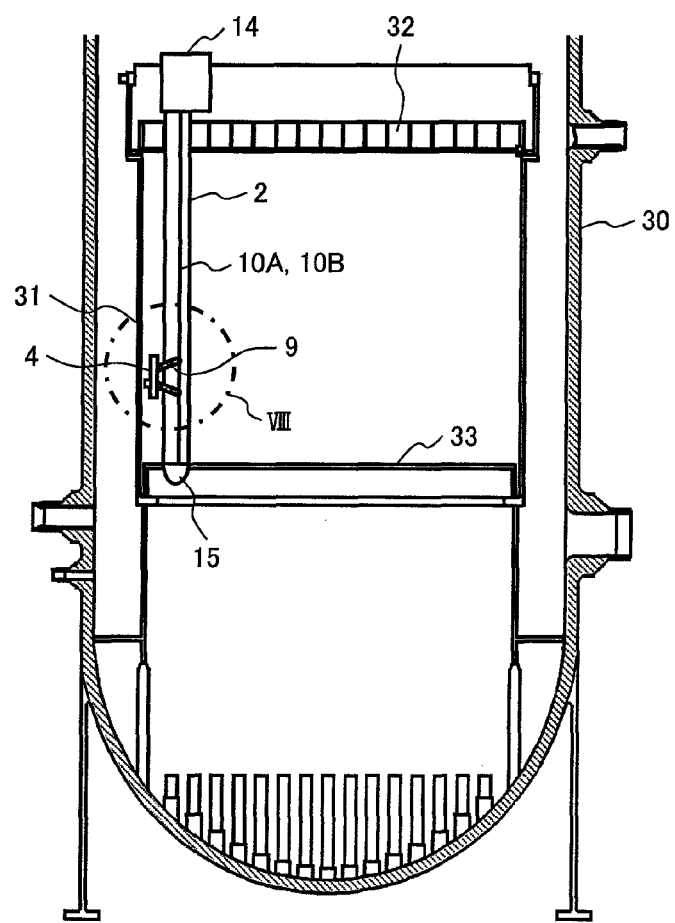
FIG. 7 an explanatory drawing showing a state in which water jet peening is executed for a core shroud by using a nozzle apparatus of a water jet peening apparatus shown in FIG. 4.
Figure 8:
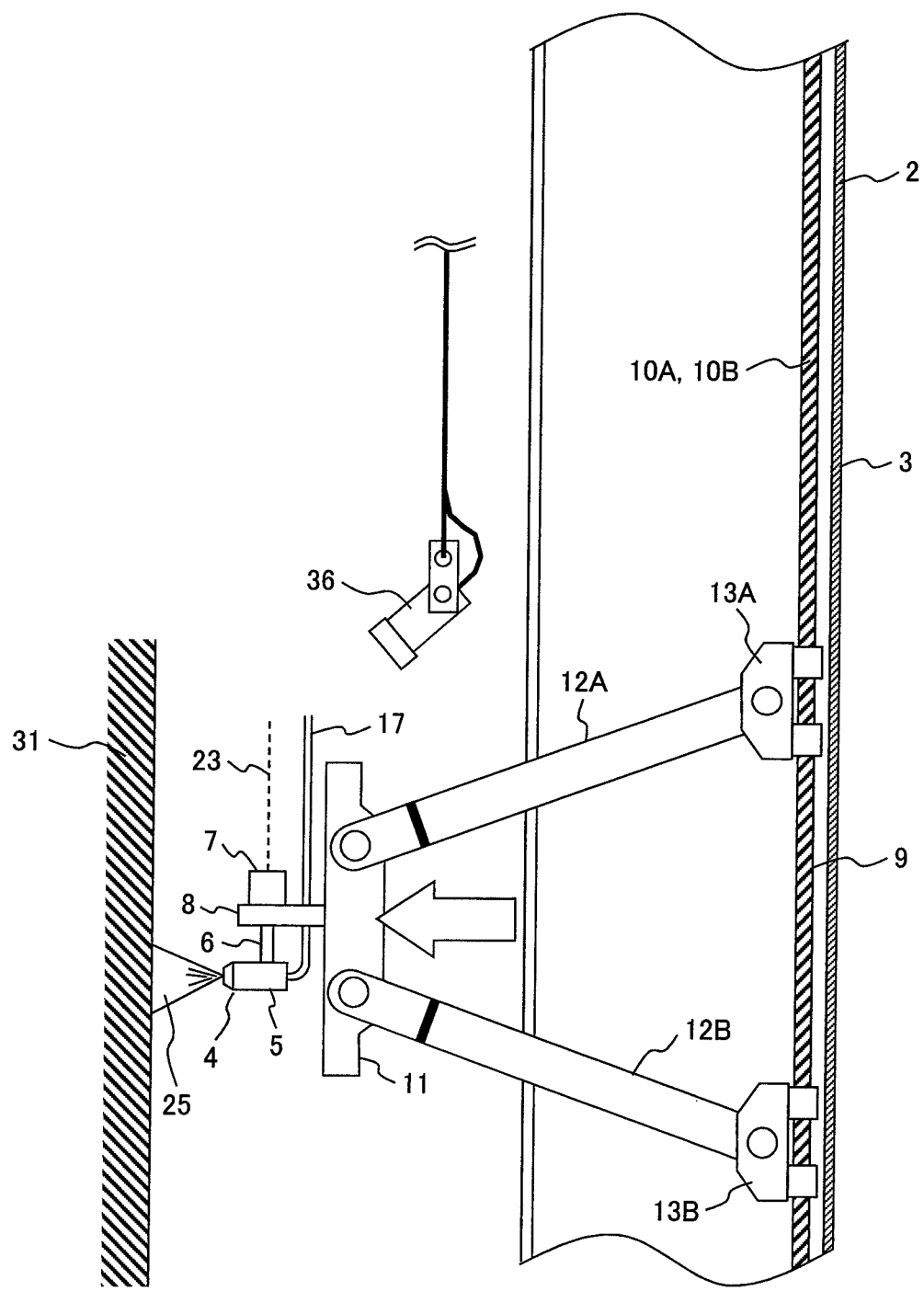
FIG. 8 is an enlarged view of portion VIII shown in FIG. 7.

As shown in FIG. 4, the WJP apparatus 1 is provided with a nozzle holding apparatus 2, a nozzle apparatus 4, a nozzle scanning apparatus 9, and a water supply apparatus 29. The nozzle holding apparatus 2 has a casing 3 and a support 15, the support 15 being disposed at the lower end of the casing 3. The casing 3 has a rectangular cross section as shown in FIG. 6. In one side of the casing 3, an opening 24 extending in the axial direction is formed.

Figure 5:
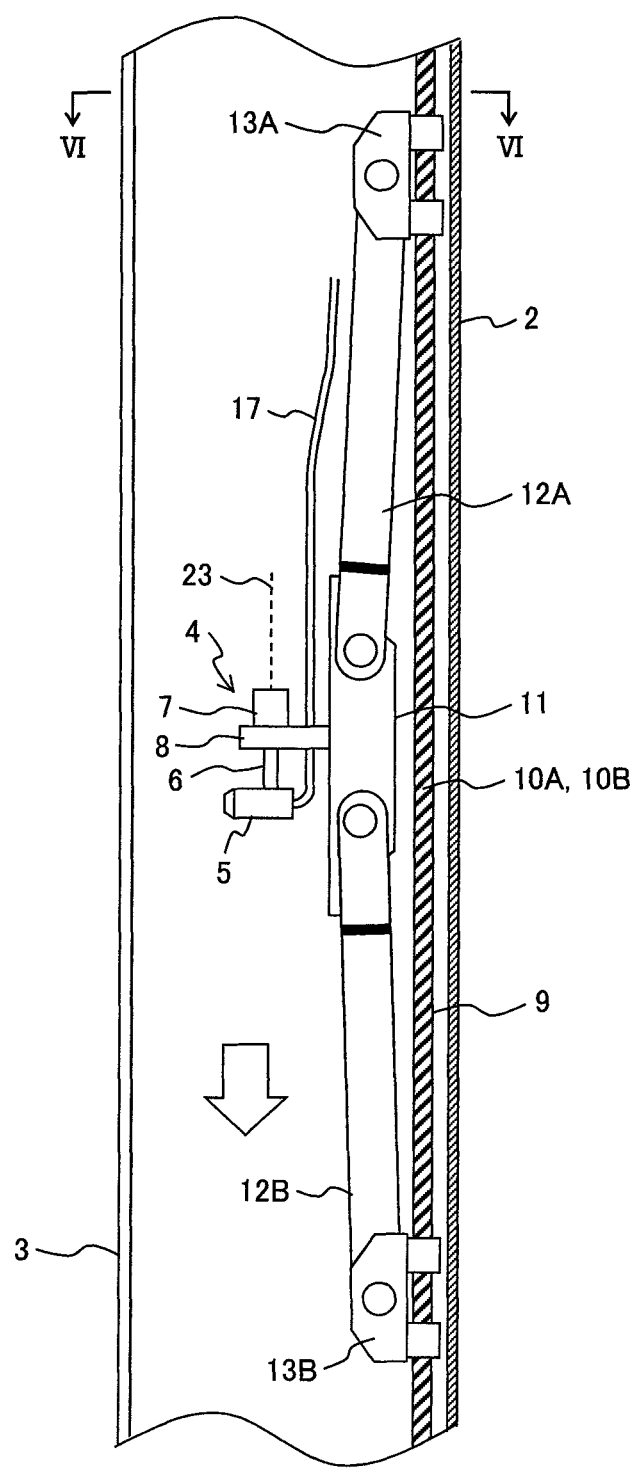
FIG. 5 is an enlarged view of portion V shown in FIGS. 4 and 24.

The nozzle scanning apparatus 9 has transfer rods 10A and 10B, moving members 13A and 13B, and two motors (drive apparatus such as step motor) 14 (see FIGS. 4 and 5). The two motors 14 are disposed on the top of the casing 3. The two transfer rods 10A and 10B, which a screw is formed on each of their surfaces, are disposed side by side in the casing 3 (see FIG. 6). Lower ends of the transfer rods 10A and 10B are separately supported by two bearings (not shown) provided on the support 15. The rotational axis of one motor 14 is linked to an upper end of the transfer rod 10A. The rotational axis of the other motor 14 is linked to an upper end of the transfer rod 10B. The moving members 13A and 13B are disposed in the casing 3. The moving member 13A engages with the screw formed in the transfer rod 10A, and the moving member 13B engages with the screw formed in the transfer rod 10B. The transfer rod 10A passes through a through-hole formed in the moving member 13B, and does not engage with the moving member 13B. The transfer rod 10B passes through a through-hole formed in the moving member 13A, and does not engage with the moving part 13A. A link 12A is rotatably attached to the moving member 13A by a pin at one end. A link 12B is rotatably attached to the moving member 13B by a pin at one end. The links 12A and 12B are also rotatably attached to a support member 11 by pins at the other ends.

The nozzle apparatus 4 is attached to the support member 11. The nozzle apparatus 4 has a nozzle 5, a rotational shaft 6, a rotating apparatus 7, and a nozzle support member 8. The nozzle support member 8 is attached to the support member 11, and the rotating apparatus 7 is attached to the nozzle support member 8. The nozzle 5 is attached to a lower end of the rotational shaft 6 held by a bearing (not shown) mounted to the nozzle support member 8. The rotating apparatus 7 has a motor (not shown), such as a step motor, and a decelerator (not shown). A gear (not shown) attached to the rotational shaft 6 engages with the gear of the decelerator.

The water supply apparatus 29 has a high-pressure pump 16, a feed water hose 17, and a pressure regulating valve 20. The feed water hose 17 connected to the high-pressure pump 16 is disposed in the casing 3 and connected to the nozzle 5. A feed water pipe 18 is connected to the high-pressure pump 16. A return pipe 19, on which the pressure regulating valve 20 is disposed, is connected to the feed water hose 17 and feed water pipe 18.

Essential of the WJP execution by using the WJP apparatus 1 will be described below. The WJP object is a core shroud 31, for example, which is a reactor internal disposed in a reactor pressure vessel 30 of a boiling water reactor. The outline of the boiling water reactor will be described below by referred to FIG. 4. The boiling water reactor has a reactor pressure vessel 30 in which a core (not shown) is provided. A core shroud 31, which is cylindrical, an upper grid plate 32, a core support plate 33, and other members are disposed in the reactor pressure vessel. The core loaded with a plurality of fuel assemblies (not shown) is surrounded by the core shroud 31. In the core shroud 31, the upper grid plate 32 is disposed at an upper end of the core shroud 31 and attached to the core shroud 31. The core support plate 33 is disposed below the upper grid plate 32 in the core shroud 31 and attached to the core shroud 31. A lower end portion of each fuel assembly loaded in the core is supported by the core support plate 33, and an upper end of the fuel assembly is supported by the upper grid plate 32.

The WJP for the core shroud 31 is executed during periodic inspection carried out after the operation of the boiling water reactor was shut down. After the shutdown of the operation of the boiling water reactor, an upper lid (not shown) is removed from the reactor pressure vessel 30. The reactor pressure vessel 30 and a reactor well 34 disposed above the reactor pressure vessel 30 are filled with cooling water 37. After the reactor pressure vessel 30 has been released, a steam drier (not shown) and a steam separator (not shown), which are disposed above the upper grid plate 32 in the reactor pressure vessel 30, are taken out of the reactor pressure vessel 30 in succession. All the fuel assemblies loaded in the core are held by a fuel exchange apparatus (not shown), taken out of the core support plate 33, and transferred to a fuel storage pool (not shown).

After all the fuel assemblies were transferred from the core to the fuel storage pool, the nozzle holding apparatus 2 having the nozzle apparatus 4 and nozzle scanning apparatus 9 is located at a predetermined position in the core shroud 31 on which to execute the WJP. The nozzle holding apparatus 2 is located by a worker riding on the fuel exchange apparatus. The fuel exchange apparatus is movably disposed on an operation floor 35, which is formed in a reactor building (not shown) disposed the reactor pressure vessel 30 therein and encloses the reactor well 34. The worker on the fuel exchange apparatus transfers the nozzle holding apparatus 2 to an area in the core shroud 31 disposed below the upper grid plate 32 through one square formed in the upper grid plate 32, by using tongs, while checking an image around the nozzle holding apparatus 2, which is photographed with an underwater camera, on a TV monitor. The support 15 of the nozzle holding apparatus 2 is held by the core support plate 33 (see FIG. 4). The nozzle holding apparatus 2, the lower end of which is held by the core support plate 33 and the upper end of which is held by the upper grid plate 32, is present in the cooling water 37 in the reactor pressure vessel 30.

The high-pressure pump 16 is mounted on the operation floor 35. The feed water hose 17 connected to the high-pressure pump 16 extends through the reactor well 34 and upper grid plate 32 to the position of the nozzle 5 in the nozzle holding apparatus 2 held by the core support plate 33. A control apparatus 21 and an operation panel 22 connected to the control apparatus 21 by wire are also mounted on the operation floor 35. Wires 23 connected to the control apparatus 21 transmit control signals to the high-pressure pump 16, the pressure regulating valve 20, the motors 14 for the nozzle scanning apparatus 9, and a motor for the nozzle apparatus 4, these motors being disposed in the nozzle holding apparatus 2. Cables (not shown) are connected to these motors to supply driving currents.

An operator enters a nozzle setting signal on the operation panel 22. The control apparatus 21, which received the nozzle setting signal, moves the pertinent nozzle 5 to a WJP start position (represented by a position in the axial direction of the core shroud 31 and a position in a radial direction of the core shroud 31) on an inner surface of the core shroud 31, and controls the driving of the pertinent motor so that the injection angle Ψ formed by the axial center of the nozzle 5 and the core shroud 31 on a horizontal cross section of the core shroud 31 becomes a set injection angle.

With the nozzle apparatus 4 accommodated in the casing 3, the two motors 14 rotate in the same direction (clockwise, for example) in response to a first control signal (generated when the nozzle setting signal is input) from the control apparatus 21. Then, the transfer rods 10A and 10B rotate clockwise, and the nozzle apparatus 4, support member 11, links 12A and 12B, and moving members 13A and 13B are descended. When the nozzle 5 is lowered to the WJP start position in the axial direction of the core shroud 31, the rotation of the two motors 14 is stopped under control by the control apparatus 21.

Then, the motor 14 linked to the transfer rod 10A and the motor 14 linked to the transfer rod 10B rotate in opposite directions in response to a second control signal sent from the control apparatus 21. For example, the motor 14 linked to the transfer rod 10A may rotate clockwise and the motor 14 linked to the transfer rod 10B may rotate counterclockwise. When the transfer rod 10A rotates clockwise, the moving member 13A is descended. When the transfer rod 10B rotates counterclockwise, the moving member 13B is ascended. Then, the interval between the moving member 13A and moving member 13B is narrowed (see FIGS. 7 and 8). As a result, the nozzle apparatus 4 horizontally moves toward the inner surface of the core shroud 31, which is the WJP object. When the end of the nozzle 5 reaches the WJP start position in a radial direction of the core shroud 31, the rotation of the two motors 14 is stopped under control by the control apparatus 21.

Furthermore, the motor of the nozzle apparatus 4 is driven in response to a third control signal from the control apparatus 21 to rotate the rotational shaft 6 so that the injection angle Ψ formed by the axial center of the nozzle 5 and the core shroud 31 on a horizontal cross section of the core shroud 31 is adjusted to a set injection angle (90°, for example). Then, the end of the nozzle 5 is set to an injection start position, and the distance between the end of the nozzle 5 and the inner surface of the core shroud 31 is set to the predetermined injection distance S (140 mm, for example). The operator monitors the movement of the nozzle 5 while checking an image sent from an underwater camera 36 (see FIG. 8) and displayed on a TV monitor provided on the operation panel 22.

When the positioning of the nozzle 5 is completed, the operator enters a WJP start signal from the operation panel 22 to the control apparatus 21. Upon receipt of the WJP start signal, the control apparatus 21 starts the high-pressure pump 16. Water supplied by the feed water pipe 18 is pressurized by the high-pressure pump 16 and becomes high-pressure water. The high-pressure water is introduced to the nozzle 5 through the feed water hose 17 and is jetted from the injection outlet of the nozzle 5 as the jet flow 25 (see FIG. 8). The injection outlet of the nozzle 5 is 2 mm in bore. The control apparatus 21 controls the degree of the opening of the pressure regulating valve 20 to adjust the pressure of the high-pressure water supplied to the nozzle 5 to, for example, 70 MPa and also controls the rotational speed of the high-pressure pump 16 to adjust the flow rate of the high-pressure water supplied to the nozzle 5 to, for example, 48 L/min, the flow rate being the amount of water jetted from the injection outlet. As a result, high-pressure water under a pressure of 70 MPa is jetted, as the jet flow 25, from the injection outlet of the nozzle 5 at a flow rate of 48 L/min. When the degree of the opening of the pressure regulating valve 20 is reduced, the pressure of the high-pressure water supplied to the nozzle 5 is increased.

When many cavitation bubbles 27 included in the jetted jet flow 25 are collapsed, collapse pressure is generated. The collapse pressure is transferred through the cooling water 37 in the core shroud 31 and impinged on the inner surface of the core shroud 31, which faces the injection outlet of the nozzle 5. Tensile residual stress on the inner surface of the core shroud 31 is improved to compressive residual stress, due to the effect of the collapse pressure. The WJP is executed along a weld line on the core shroud 31. Accordingly, the control apparatus 21 rotates the two motors 14, for example, counterclockwise to rotate the transfer rods 10A and 10B counterclockwise and lifts the nozzle apparatus 4 along the weld line. The control apparatus 21 controls the rotational speeds of the two motors 14 to adjust the travel speed of the nozzle 5 so that the injection time of the jet flow 25 jetted to the inner surface of the core shroud 31 becomes 40 min/m for example. Then, the WJP is executed on the inner surface of the core shroud 31 along the weld line.

To execute the WJP along another weld line in the circumferential direction of the core shroud 31, the nozzle holding apparatus 2 is lifted above the upper grid plate 32 and then lowered through another square of the upper grid plate 32 at a position facing to the other weld line, and the core support plate 33 holds the support 15 of the nozzle holding apparatus 2. When the nozzle holding apparatus 2 is moved in this way, the WJP can be executed along the other weld line on the inner surface of the core shroud 31. After the above process is repeated along weld lines on the inner surface of the core shroud 31, the WJP for the core shroud 31 is completed.

After that, the evaluation of the residual stress generated on the inner surface of the core shroud 31 due to WJP executed as described above is performed through the evaluation method of residual stress in the WJP in the present embodiment. In this residual stress evaluation, a computer 40 shown in FIG. 3 executes processing in steps S1 to S6 shown in FIG. 1. The evaluation method of residual stress in the WJP in the present embodiment will be described below by referred to FIGS. 1 and 2.

Figure 3:
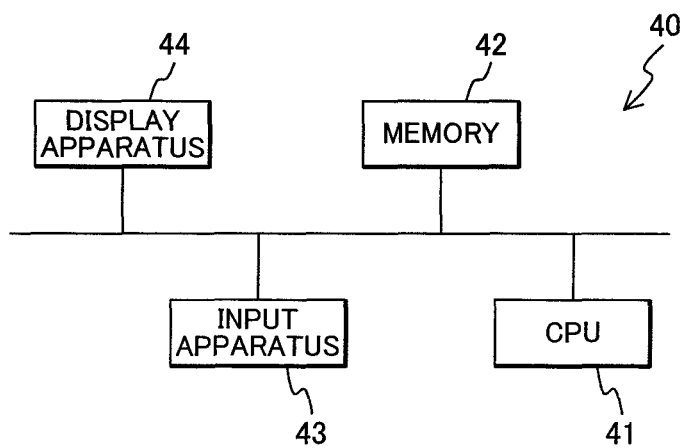
FIG. 3 is a structural diagram showing a computer that executes processing shown in FIG. 1.

In the computer 40, a memory 42, an input apparatus 43, and a display apparatus 44 are connected to a central processing unit (CPU) 41 as shown in FIG. 3. A program that executes processes of steps S1 to S6 is stored in the memory 42. The CPU 41 reads the program from the memory 42 to have the program execute processes of steps S1 to S6.

First, an analytical model is created (step S1). The analytical model targeted for the core shroud 31, described above, on which the WJP was executed, is created. To create the analytical model, the operator entered, from the input apparatus 43, the bore (2 mm) of the injection outlet of the nozzle 5 used in the WJP on the inner surface of the core shroud 31, the enlarged angle (30°), the jet distance S (140 mm), the injection angle Ψ (90°), and the material (SUS316L) and surface shape of the core shroud 31, which is the WJP object, as described in 2-2 section (analysis area and boundary conditions) on page 334 and FIG. 1 of "Masashi Fukaya et al., Development of Water Jet Peening (WJP) (3), Flow Behavior Evaluation in WJP, Japan Society of Mechanical Engineers No. 09-3, M&M 2009 Conference 0S1431, Jul. 24 to 26, 2009, pp. 333-334". By taking a range within a radius of 150 mm around an extension line of the axial center of the nozzle 5 as an analysis object area, the operator also entered, from the input apparatus 43, $1.0 \times 10^5$ Pa as a pressure boundary condition over the axial direction of the nozzle 5 at positions on the 150 mm radius centered around the extension line. The range in the axial direction of the nozzle 5 in the analysis object area is present between the end of the nozzle 5 and the inner surface of the core shroud 31, the range being within an injection distance of 140 mm. The analysis object area is a cylindrical area with a radius of 150 mm and a length of 140 mm. Since the core shroud 31 has a large inner diameter (for example, a boiling water reactor in the 1.1 million kW class has an inner diameter of 5 m), it is practically a flat plate in the area with a radius of 150 mm. Therefore, the core shroud 31 is handled as a flat plate in the analysis object area. The operator entered an initial value of the bubble number density $n_g$ (239 bubbles/mm$^3$, for example) and an initial value of the bubble diameter (0.01 mm, for example), which are necessary in analysis, from the input apparatus 43. The operator also entered, from the input apparatus 43, a mesh width from the end of the nozzle 5 to the inner surface of the core shroud 31 and a mesh width from the extension line of the axial center of the nozzle 5 in a radial direction of the jet flow 25. These input information items entered from the input apparatus 43 are input into the CPU 41 and stored in the memory 42.

Figure 2:
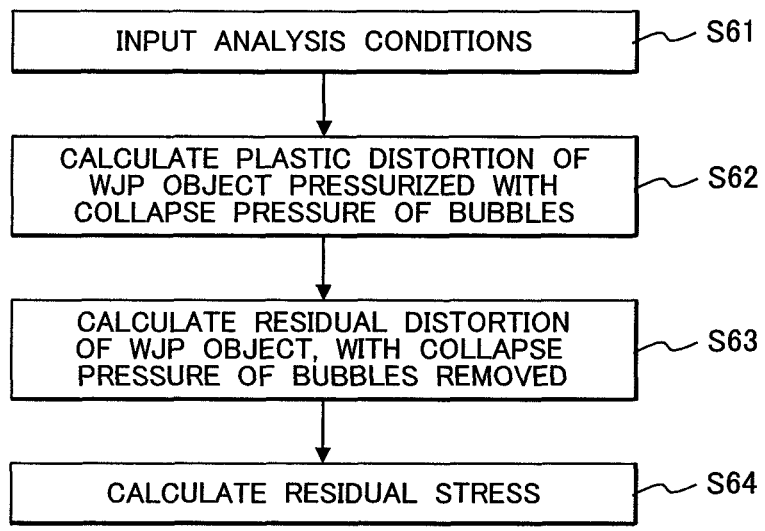
FIG. 2 is a flowchart showing detailed processing in step S6 shown in FIG. 1.

The CPU 41 creates the meshes shown in FIG. 1 on page 334 of "Masashi Fukaya et al., Development of Water Jet Peening (WJP) (3), Flow Behavior Evaluation in WJP, Japan Society of Mechanical Engineers No. 09-3, M&M 2009 Conference 0S1431, Jul. 24 to 26, 2009", according to the entered mesh widths, injection distance S, and 150 mm radius, by which the analysis object area is identified.

The WJP execution conditions are input (step S2). The operator enters the conditions for the WJP that was executed on the inner surface of the core shroud 31. The WJP execution conditions are the injection velocity of the jet flow 25 jetted from the injection outlet of the nozzle 5, the injection pressure (70 MPa), the injection distance S (140 mm), the injection angle Ψ (90°), and the injection time (40 min/m). The injection distance S and injection angle Ψ have already been entered in step S1 to create the analytical model, so only the injection velocity and injection time are entered from the input apparatus 43 in step S2. The injection outlet of the nozzle 5 used to execute the WJP on the inner surface of the core shroud 31 is 2 mm in bore. The flow rate of the jet flow 25 jetted from the injection outlet is 48 L/min. Therefore, the injection velocity is 254.8 m/s. The injection velocity and injection time entered from the input apparatus 43 are input into the CPU 41 and stored in the memory 42.

The bubble's internal pressure $p_B$ and bubble number density $n_g$ are calculated through jet flow analysis (step S3). Jet flow analysis executed in step S3 is described on page 333 of "Masashi Fukaya et al., Development of Water Jet Peening (WJP) (3), Flow Behavior Evaluation in WJP, Japan Society of Mechanical Engineers No. 09-3, M&M 2009 Conference 0S1431, Jul. 24 to 26, 2009". In step S3, a bubble flow model is used in the jet flow analysis.

Jet flow analysis is executed for all partitions of the mesh created in step S1 sequentially from the partition adjacent to the injection outlet of the nozzle 5.

In the mesh partition adjacent to the injection outlet of the nozzle 5, the initial injection velocity of the entering jet is 254.8 m/s, the initial bubble number density is 239 bubbles/mm$^3$, and the initial bubble diameter is 0.01 mm.

The analysis described in (A) above is executed. The velocity of flow and pressure of the jet flow 25 jetted from the nozzle 5 and of the cooling water 37 present in the vicinity of the inner surface of the core shroud 31 are calculated from the initial injection velocity of the jet flow and the Navier-Stokes equation. The analysis described in (B) above is executed. Analysis is performed on the assumption that the translation motion of cavitation bubbles in the flow field is the same as the motion of the jet flow 25 (their slip rate is 0). In this case, a cavitation bubble moves together with the flow of the jet flow 25 jetted from the nozzle 5, the velocity vector of the flow, which is obtained by the calculation in (A), is used as the velocity vector of the cavitation bubble without alteration. Therefore, there is no need to solve a motion equation for the bubble. If the cavitation bubble moves differently from the jet flow 25, however, it is necessary to solve a motion equation in which the balance of forces exerted on the cavitation bubble (added inertial force, force caused by accelerated peripheral fluid, lift force, and drag force, for example) is formulated. By solving the motion equation, the velocity vector of the cavitation bubble is obtained. The analysis described in (C) above is executed. A scalar transport equation in which the bubble number density $n_g$ (the number of bubbles per unit volume) used as a variable is solved by using the initial value of the bubble number density $n_g$ and the analysis result obtained in the analysis of the translation motion of the bubble in (B), and a spatial distribution of the number of bubbles is calculated.

Analysis described in (D) above is executed. In this analysis, the expansion and contraction motion of the cavitation bubbles is analyzed by using the Rayleigh-Plesset equation, which is a motion equation in which a relationship between a bubble's internal pressure $p_B$ and pressure $p_L$ of a fluid around bubbles is formulated, and the bubble's internal pressure $p_B$ is calculated. The Rayleigh-Plesset equation is represented as equation (6) below.

$$r_G \frac{D^2 r_G}{Dt^2} + \frac{3}{2}\left(\frac{Dr_G}{Dt}\right)^2 = \frac{p_B - p_L}{\rho_L} \tag{6}$$

In the above equation, $r_G$ is a diameter of the bubble, $p_L$ is pressure of water (jetted high-pressure water or cooling water 37) around the bubbles and ρL is density of the water around the bubbles. The bubble's internal pressure $p_B$ is obtained from equations (7) to (9).

$$p_B = p_G + p_v - \frac{2T}{r_G} - 4\mu \frac{1}{r_G} \frac{Dr_G}{Dt} \tag{7}$$

-continued $$p_G r_G^3 = \text{const} \left( \frac{dr_G}{dt} > 0 \right) \quad (8)$$

$$p_G r_G^{3k} = \text{const} \left( \frac{dr_G}{dt} < 0 \right) \quad (9)$$

In the above equation, $p_G$ is pressure of a non-condensable gas, $p_V$ is a steam pressure (fixed to 2300 Pa at ordinary temperatures), T is surface tension of the bubble, and μ is coefficient of viscosity of the water around the bubbles.

The bubble's internal pressure $p_{Bi}$ and bubble number density $n_{gi}$ can be obtained in each partition of the mesh by the above analyses.

Cavitation energy is calculated (step S4). The cavitation energy C is calculated by substituting the bubble's internal pressure $p_{Bi}$ and bubble number density $n_{gi}$ calculated in each partition into equation (2).

The collapse pressure of bubbles is calculated (step S5). The cavitation energy C calculated in step S4 is substituted into equation (5) to calculate the collapse pressure P of bubbles.

The residual stress of the WJP object is calculated (step S6). The residual stress of the WJP object is calculated through stress analysis in which the collapse pressure P of bubbles calculated from equation (5) is used. Specifically, the residual stress of the WJP object is calculated by executing processing in steps S61 to S64 shown in FIG. 2.

First, analysis conditions necessary for the stress analysis are input (step S61). In the stress analysis to calculate the residual stress of the WJP object, an axially symmetrical model, the central axis of which is a Z-axis, is used, the model being described on page 335 of "Hisamitsu Hatou et al., Development of Water Jet Peening (WJP) (4), Residual Stress Improvement Behavior Evaluation in WJP), Japan Society of Mechanical Engineers No. 09-3, M&M 2009 Material & Mechanics Conference 2009, CD-ROM Transactions, 0S1431, Jul. 24 to 26, 2009". This axially symmetrical model is a model in which the depth direction, radial direction, and circumferential direction of the core shroud 31, which is the WJP object, are respectively denoted Z, R, and θ, the flexibility of the Z-axis is restrained and the collapse pressure of bubbles on the Z-axis surface is exerted as an equally distributed load.

The analysis conditions input from the input apparatus 43 into the CPU 41 in step S61 are: a time taken to increase the collapse pressure of cavitation bubbles, which is a parameter, from 0 GPa to the collapse pressure P of cavitation bubbles, which is calculated in step S5, that is, a time to cavitation bubble collapse (1 μS, for example); a time taken to reduce the collapse pressure of the cavitation bubbles from the collapse pressure P of cavitation bubbles, which is calculated in step S5, to 0 GPa (1 μS, for example); the diameter of an average peening trace (0.25 mm, for example); the Young's modulus (195 GPa) of the core shroud 31 made of SUS316L; the yield stress (600 MPa) of the core shroud 31; and the work hardening coefficient (1.95 GPa) of the core shroud 31. These analysis conditions are stored in the memory 42 by the CPU 41. The diameter of the average peening trace is a diameter affected by the collapse pressure exerted on the surface of the core shroud 31, which is the WJP object. The diameter of the average peening trace can be obtained by executing the WJP on a test piece made of SUS316L in advance and measuring a recess (peening trace) generated on the surface of the test piece due to that WJP. The average of the average peening is obtained for each WJP in which a different injection velocity of the jet flow 25 jetted from the nozzle 5 is used.

The plastic strain of the WJP object is calculated, the WJP object being pressurized with the collapse pressure of bubbles (step S62). The plastic strain of the core shroud 31, which is caused by plastic deformation, was calculated on the extension line of the axial center of the nozzle 5 (the center of the jet flow) through stress analysis in which the collapse pressure of cavitation bubbles was increased from 0 GPa to the collapse pressure P of cavitation bubbles, which was calculated in step S5. In the stress analysis for calculating the plastic strain, WJP parameters other than the collapse pressure P of cavitation bubbles (specifically, the time to cavitation bubble collapse, the diameter affected by the collapse pressure, and the number of applications of the collapse pressure) were also used. The 0.25 mm diameter of the average peening trace was used as the diameter affected by the collapse pressure of cavitation bubbles, and the number of applications of the collapse pressure was set to 1.

In a state in which the inner surface of the core shroud 31 is pressurized by the collapse pressure of cavitation bubbles, the inner surface of the core shroud 31 is pressed with the collapse pressure and if the yield stress of the core shroud 31 is exceeded, it undergoes plastic strain. The plastic strain is obtained from the physical properties (stress-strain relationship determined by Young's modulus, yield stress and the work hardening coefficient) of the material, which are given in advance. In step S62, the plastic strain of the core shroud 31 was calculated at a plurality of positions (25 positions) in the depth direction from the inner surface of the core shroud 31. The obtained values of the plastic strain are negative, so compressive stress is caused near the inner surface of the core shroud 31 by plastic strain due to the executed WJP.

The residual strain of the WJP object is calculated in a state in which the collapse pressure of bubbles was removed (step S63). The residual strain of the core shroud 31 with the collapse pressure removed was calculated on the extension line of the axial center of the nozzle 5 (the center of the jet flow), and the collapse pressure of cavitation bubbles was calculated through the stress analysis in which the collapse pressure of cavitation bubbles was reduced from the collapse pressure P of cavitation bubbles, which was calculated in step S5, to 0 GPa. That is, when the collapse pressure of cavitation bubbles is removed from the inner surface of the core shroud 31, elastic strain is released from strain caused in the core shroud 31. Therefore, the residual strain in the core shroud 31 is strain obtained by subtracting the elastic strain from the plastic strain obtained in step S62. The residual strain in the core shroud 31 was calculated at the positions at which the plastic strain was calculated in the depth direction from the inner surface of the core shroud 31.

The residual stress is calculated (step S64). According to the residual strain calculated at the positions on the extension line of the axial center of the nozzle 5 through stress analysis, the residual stress is calculated at these positions on the core shroud 31. In the residual stress calculation based on the residual strain, a relationship between the strain and stress of the WJP object, that is, between the strain and stress of SUS316L of which the core shroud 31 is made is used, and the residual stress is calculated by multiplying a difference in strain (elastic strain) obtained by subtracting the residual strain obtained in step S63 from the plastic strain obtained in step S62 by the Young's modulus. Compressive residual stress is obtained at positions in the depth direction from the surface of the core shroud 31, on the extension line of the center of the jet flow, that is, the axial center of the nozzle 5. In the depth direction, the compressive residual stress is obtained in the range from the surface of the core shroud 31 to, for example, a depth of 0.5 mm.

The CPU 41 in the computer 40, which executes the residual stress evaluation method in the present embodiment, practically has a jet flow analysis apparatus for calculating the bubble's internal pressure $p_B$ and bubble number density $n_g$ in step S3, a cavitation energy calculation apparatus for calculating the cavitation energy in step S4, a bubble collapse pressure calculation apparatus for calculating the collapse pressure of cavitation bubbles in step S5, and a stress analysis apparatus for calculating the residual stress of the WJP object in step S6. The stress analysis apparatus includes a plastic strain calculation apparatus for calculating the plastic strain of the WJP object in step S62, a residual strain calculation apparatus for calculating the residual strain of the WJP object in step S63, and a stress calculation apparatus for calculating the residual stress of the WJP object according to the plastic strain and residual stress.

According to the present embodiment, since the bubble's internal pressure $p_B$ and bubble number density $n_g$ are obtained through jet flow analysis, the accuracy of the bubble's calculated internal pressure $p_B$ and bubble number density $n_g$ can be improved. Since cavitation energy is calculated based on the bubble's internal pressure $p_B$ and bubble number density $n_g$ and the collapse pressure of bubbles is calculated based on the obtained cavitation energy, the collapse pressure of bubbles, which has been hard to calculate in the past, can be calculated in a short time with improved accuracy. The compressive residual stress of the core shroud 31, which is the WJP object, can be calculated with high accuracy because the stress analysis is performed by using the calculated collapse pressure of bubbles. Thus, the accuracy of the calculated compressive residual stress can be improved. Accordingly, according to the present embodiment, the residual stress of the core shroud 31 can be evaluated in a short time and the accuracy of the evaluation can be improved.

In particular, since the collapse pressure of bubbles included in the jet flow 25 is calculated by substituting the cavitation energy into equation (5), the collapse pressure of bubbles can be obtained in a short time with high accuracy. Accordingly, the residual stress of the WJP object on which WJP was executed (the core shroud 31, for example) can be evaluated in a short time and the evaluation accuracy can be improved accuracy.

Many reactor internals in nuclear plants are complexly shaped and have many narrow portions. Therefore, when the WJP is executed for these reactor internals, to determine WJP execution conditions for each of them, it is necessary to carry out many experiments in advance for each reactor internal, or for each of the different places where the WJP is executed even in the same reactor internal. A great effort is required to execute these experiments each time WJP execution conditions are determined. Since it has been confirmed that the relationship between the cavitation energy and collapse pressure of bubbles, represented by equation (5) and used in evaluation in the present embodiment, can be applied to any types of reactor internals, the present embodiment eliminates the need to execute these many experiments.

The present embodiment can be applied to evaluate the residual stress not only of the core shroud 31 but also of other reactor internals, in boiling water reactors, on which WJP was executed.

Second Embodiment

An evaluation method of residual stress in water jet peening according to embodiment 2 which is another embodiment of the present invention will be described by referred to FIGS. 22 and 23.

Although, the evaluation method the residual stress evaluation method in WJP according to embodiment 1 evaluates the residual stress of a WJP object after the WJP was executed to the WJP object, the evaluation method of the residual stress in the WJP in the present embodiment evaluates the residual stress of a WJP object before the WJP is executed for it as if WJP were executed so that appropriate WJP execution conditions are selected for the WJP object.

Figure 22:
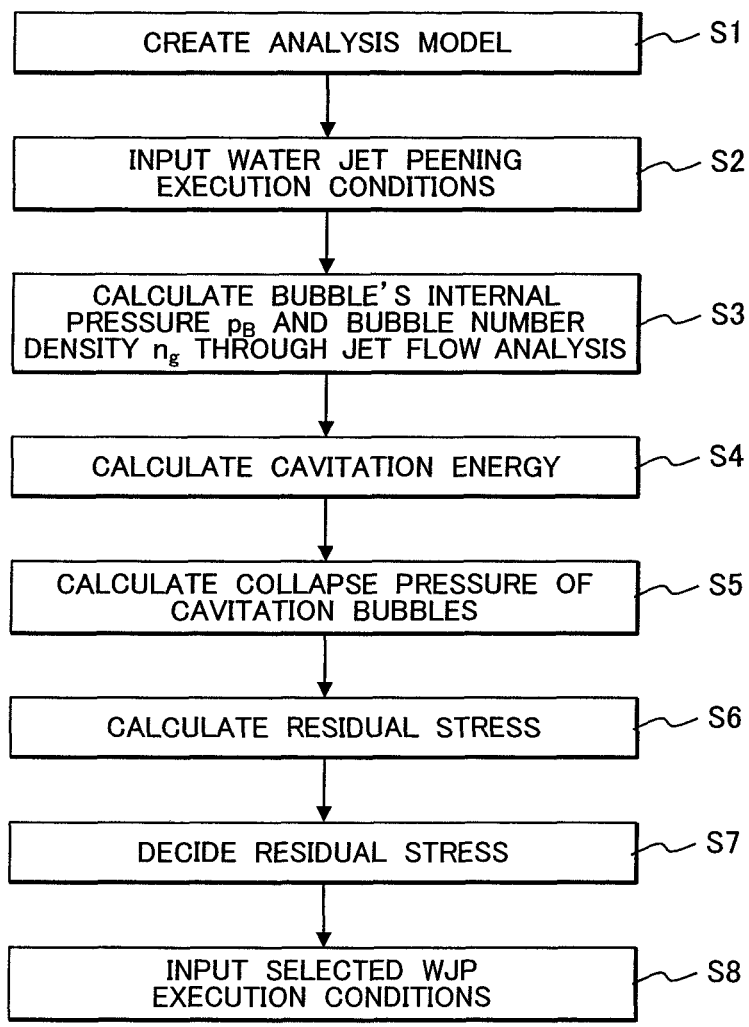
FIG. 22 is a flowchart showing processing in an evaluation method of residual stress in water jet peening according to embodiment 2 which is another embodiment of the present invention.

In the evaluation method of residual stress evaluation method in WJP in the present embodiment, the CPU 41 in the computer 40 executes the processing in steps S1 to S8 shown in FIG. 22. The processing in steps S1 to S6 executed in the present embodiment is the same as the processing in steps S1 to S6 executed in embodiment 1. The processing executed in the evaluation method of the residual stress in WJP in the present embodiment is added the steps S7 and S8 shown in FIG. 22 to the steps S1 to S6 executed in embodiment 1.

Only the differences from embodiment 1 will be described. In embodiment 1, residual stress is evaluated for a WJP object on which the WJP was executed, so only one analytical model is created in step S1. By comparison, since appropriate WJP execution conditions are selected in the present embodiment, a plurality of analytical models must be created. An evaluation method of the residual stress in WJP in which selection of the injection distance S and injection angle Ψ is assumed will be described below as an example. The WJP object is the core shroud 31 made of SUS316L, which is disposed in the reactor pressure vessel 30 in the boiling water reactor.

To evaluate the residual stress of the core shroud 31, the operator creates analytical models in 30 cases in which the injection angle Ψ is changed to 10°, 30°, 50°, 70°, and 90° for each of the injection distance S settings, which are 50 mm, 100 mm, 150 mm, 200 mm, 250 mm, and 300 mm, as shown under "Set combinations of jet distance and jet angle" in FIG. 23.

In step S1, the operator enters the analytical model conditions and initial values used in step S1 in embodiment 1, from the input apparatus 43 into the CPU 41. For the injection distance S and injection angle Ψ, the operator enters their combinations in the above 30 cases (such as a combination of an injection distance of 150 mm and an injection angle of 50°, a combination of an injection distance of 200 mm and an injection angle of 90°, and so on), from the input apparatus 43 into the CPU 41. The CPU 41 sets the analysis object areas. The setting of an analysis object area will be described in a case in which the injection distance S is 200 mm and the injection angle Ψ is 70°. When it is assumed that the extension line of the axial center of the nozzle 5, the extension line passing through the center of the injection outlet having 2 mm in bore, is inclined by 70° to the inner surface of the core shroud 31, an area between the end of the nozzle 5 and the core shroud 31 in the direction of the axial center of the nozzle 5 in the area within a radius of 150 mm around the extension line is set as the analysis object area. The boundary of the analysis object area at the end of the nozzle 5 is perpendicular to the extension line of the axial center of the nozzle 5. As in embodiment 1, a mesh is created between the end of the nozzle 5 and the core shroud 31 in the direction of the axial center of the nozzle 5. Analytical models are created in the same way for the remaining 29 cases in which combinations of the injection distance and injection angles have different values. For the six cases each in which the injection angle Ψ is 90°, analytical models are created as described in embodiment 1.

WJP execution conditions are entered for the 30 cases in step S2. The processing in steps S3 to S6, in which these WJP execution conditions are used, is executed for each case. For the 30 cases, the compressive residual stress is obtained at positions in the depth direction from the surface of the core shroud 31, on the extension line of the center of the jet flow, that is, the axial center of the nozzle 5. In the depth direction, the compressive residual stress is obtained in the range from the surface of the core shroud 31 to, for example, a depth of 0.5 mm.

In the present embodiment, the CPU 41 decides the residual stress (step S7). When the WJP object is made of austenitic stainless steel, if the compressive residual stress is generated due to the WJP executed for the WJP object at a depth of 100 μm from the surface of the WJP object, it is determined that the WJP has been appropriately executed for the WJP object. If the compressive residual stress is not generated due to the WJP executed for the WJP object made of austenitic stainless steel at a depth of 100 μm from the surface of the WJP object, it is determined that WJP has been inappropriately executed for the WJP object. When the WJP object is made of a Ni-base alloy, if the compressive residual stress is generated at a depth of 200 μm from the surface of the WJP object, it is determined that WJP has been appropriately executed for the WJP object.

A decision was made on the residual stress of the core shroud 31 based on each of the residual stress values calculated in step S6 for the 30 cases shown under "Set combinations of injection distance and injection angle" in FIG. 23. As indicated under "Evaluation of residual stress in combinations of injection distance and injection angle" in FIG. 23, the CPU 41 decided that the combinations of the injection distance and injection angle in the 20 shaded cases indicated by R1 and R2 are appropriate. The compressive residual stress in the cases indicated by R2 is optimum because the compressive residual stress generated due to WJP execution in these cases is larger than in the cases indicated by R1.

The CPU 41 displays the decision information about the residual stress obtained in step S7 on a display apparatus 44. For example, information indicated under "Evaluation of residual stress in combinations of injection distance and injection angle" in FIG. 23 may be displayed on the display apparatus 44. When the operator sees the displayed information, the operator selects one from the combinations of the injection distance and injection angle in the shaded cases indicated by R2, as WJP execution conditions.

The selected WJP execution conditions are input (step S8). When one combination of the injection distance and injection angle (the injection distance of 150 mm and the injection angle of 90°, for example) selected from the displayed combinations is clicked with a mouse (input apparatus), the clicked injection distance and injection angle are input to the CPU 41 and stored in the memory 42. The selected combination of the injection distance and injection angle may be input from the input apparatus 43 into the CPU 41, instead of clicking the selected combination with the mouse.

The CPU 41 in the computer 40, which executes the evaluation method of the residual stress in the present embodiment, practically has the jet flow analysis apparatus, the cavitation energy calculation apparatus, the bubble collapse pressure calculation apparatus, and the stress analysis apparatus, which have been described in embodiment 1, and has, further, a residual stress decision apparatus for deciding the residual stress in step S7.

The present embodiment can obtain the effects brought in embodiment 1. Furthermore, the present embodiment can predict the residual stress of a WJP object before WJP is executed for it as if WJP were executed, in a short time and with the improved accuracy. Therefore, the WJP execution conditions can be appropriately selected for the WJP object, based on the obtained residual stress with the improved accuracy.

According to the present embodiment, the appropriate WJP execution conditions can be accurately selected for a WJP object that has complex narrow portions because the present embodiment calculates the bubble's internal pressure $p_B$ and bubble number density $n_g$ through jet flow analysis, calculates cavitation energy from the calculated bubble's internal pressure $p_B$ and bubble number density $n_g$, calculates the collapse pressure of bubbles from the calculated cavitation energy, and calculates the residual stress of a WJP object from the calculated collapse pressure of bubbles.

When the WJP execution conditions are selected, the present embodiment can also be applied to evaluate predicted residual stress not only of the core shroud 31 but also of other reactor internals in boiling water reactors.

Embodiments 1 and 2 can be applied to evaluate the residual stress of WJP objects that are disposed in other nuclear reactors such as pressurized water reactors.

Third Embodiment

Figure 24:
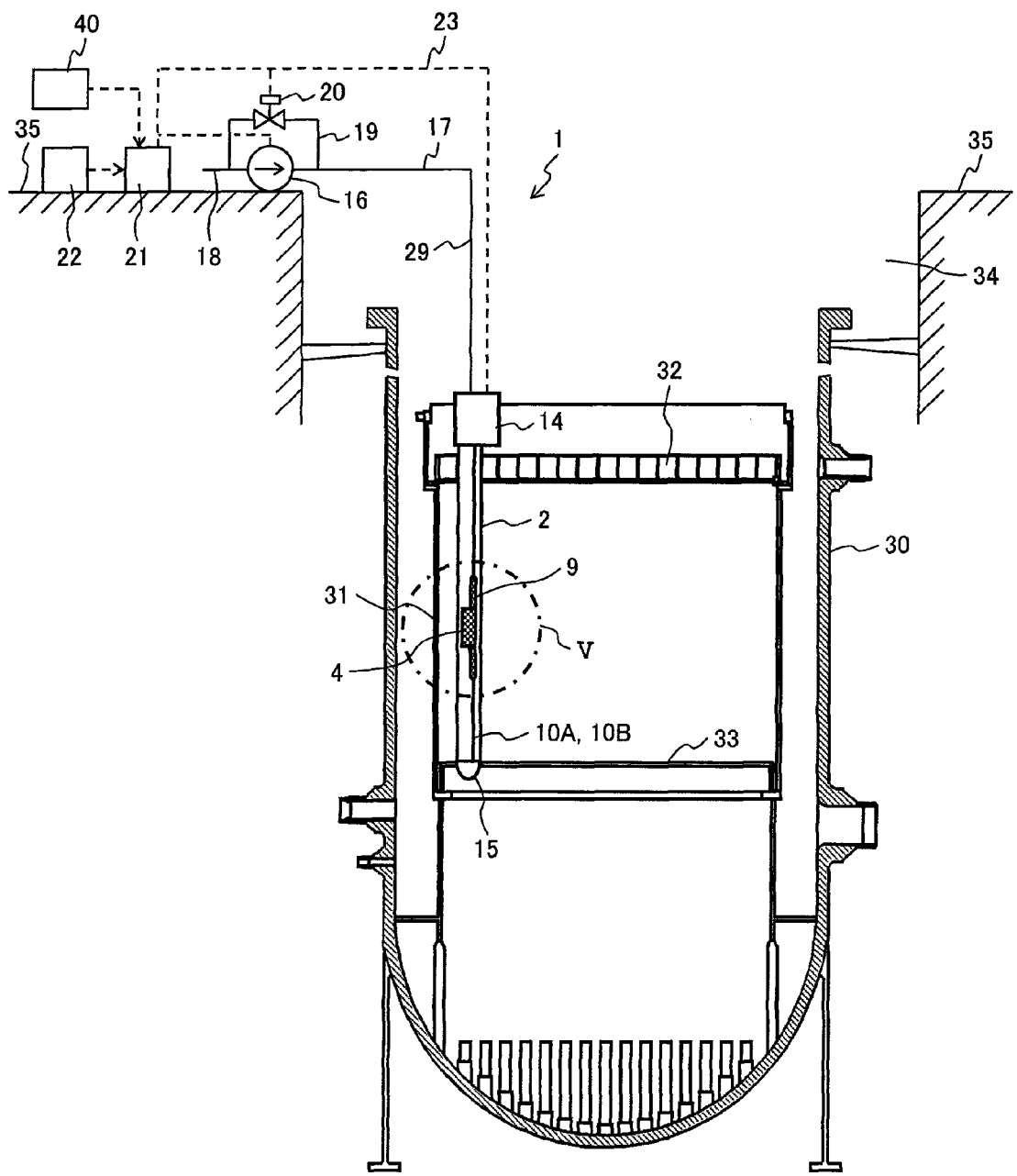
FIG. 24 is an explanatory drawing showing a method of executing a water jet peening according to embodiment 3 which is another embodiment of the present invention.

A method of executing a water jet peening according to embodiment 3 which is another embodiment of the present invention will be described with reference to FIG. 24. In the present embodiment, the water jet peening apparatus 1 used in embodiment 1 is employed.

In the method of executing a water jet peening in the present embodiment, the WJP is executed for a WJP object by using the WJP execution conditions selected by the evaluation method of the residual stress in WJP in embodiment 2. The computer 40 executes the processes shown in FIG. 22, which have been described in embodiment 2, predicts residual stress that will be generated when WJP is executed for the WJP object, and decides whether the predicted compressive residual stress satisfies a threshold. The computer 40 stores, in the memory 42, appropriate WJP execution conditions (the injection distance of 150 mm and the injection angle of 90°, for example) selected based on the decision result.

The computer (personal computer, for example) 40 is connected to the control apparatus 21. The control apparatus 21 inputs, from the computer 40, the WJP execution conditions (the injection distance of 150 mm and the injection angle of 90°, for example), shown in FIG. 23, that have been selected by the evaluation method of the residual stress in WJP in embodiment 2 as well as other WJP execution conditions (WJP execution conditions entered in steps S1 and S2, such as, for example, flow rate of high-pressure water jetted from the nozzle 5, of 48 L/min, injection pressure of 70 MPa, and injection time of 40 min/m) used in various analyses to obtain the above WJP execution conditions.

The nozzle holding apparatus 2 of the water jet peening apparatus 1 is held by the core support plate 33 and upper grid plate 32 as with embodiment 1. When the control apparatus 21 receives a WJP start signal from the operation panel 22, the control apparatus 21 outputs the first control signal to rotate the two motors 14 clockwise, and locates the nozzle 5 at the WJP start position in the axial direction of the core shroud 31. The injection outlet of the nozzle 5 is 2 mm in bore. The motor of the nozzle apparatus 4 is driven in response to the third control signal output from the control apparatus 21 so that the injection angle $\Psi$ formed by the axial center of the nozzle 5 and the core shroud 31 on a horizontal cross section of the core shroud 31 is adjusted to 90°, which is a setting input from the computer 40.

In response to the second control signal sent from the control apparatus 21, the motor 14 linked to the transfer rod 10A rotates clockwise and the motor 14 linked to the transfer rod 10B rotates counterclockwise, causing the nozzle 5 to move toward the inner surface of the core shroud 31. The distance between the end of the nozzle 5 and the inner surface of the core shroud 31 (injection distance) is set to 150 mm, which is a setting input from the computer 40. The control apparatus 21, to which the WJP start signal has been input from the operation panel 22, drives the high-pressure pump 16 and controls its rotational velocity to adjust the flow rate of the high-pressure water 26 to 48 L/min. The control apparatus 21 also controls the degree of the opening of the pressure regulating valve 20 to adjust the jet pressure to 70 MPa. The jet flow 25 of the high-pressure water 26 is jetted from the nozzle 5 and the WJP is executed on the inner surface of the core shroud 31 as described in embodiment 1.

After the WJP execution has been started, the control apparatus 21 rotates the two motors 14, for example, counterclockwise, to move the nozzle apparatus 4 along the weld line on the inner surface of the core shroud 31 to which the WJP is executed. In the movement of the nozzle apparatus 4, the control apparatus 21 controls the rotational velocities of the two motors 14 to adjust the travel velocity of the nozzle 5 so that the injection time of the jet flow 25 jetted to the inner surface of the core shroud 31 becomes 40 min/m, for example.

The present embodiment can be obtained each of the effects generated in embodiment 2 because in the present embodiment, the evaluation method of the residual stress in the WJP according to embodiment 2 is executed before WJP execution as well. Furthermore, since, in the present embodiment, appropriate WJP execution conditions selected by the evaluation method of the residual stress before the WJP is executed are used to control pertinent parts of the water jet peening apparatus 1, appropriate compressive residual stress obtained under the appropriately selected WJP execution conditions can be given to the surface of a WJP object (the core shroud 31, for example) and to its depth direction. Appropriate WJP conditions can also be selected in advance in the WJP execution even for a narrow part of a WJP object, so the WJP can be superiorly executed for the narrow part.

The present embodiment can be applied to the WJP execution not only for the core shroud 31 but also for other reactor internals in boiling water reactors. Furthermore, the present embodiment can be applied to WJP execution for WJP objects provided in other nuclear reactors such as pressurized water reactors.

The embodiment 3 can also be applied to WJP executed for parts and other structure members used in apparatuses other than nuclear plants when these structure members are immersed in water in a water tank. The embodiment 1 and 2 can also be applied in evaluation of the residual stress of these structure members.

INDUSTRIAL APPLICABILITY

The present invention can be applied to the evaluation of the residual stress of structure members being WJP object in nuclear plants and other plants and to the evaluation of the residual stress of parts being WJP object in an ordinary apparatus.

REFERENCE SIGNS LIST

1: water jet peening apparatus, 2: nozzle holding apparatus, 4: nozzle apparatus, 5: nozzle, 7: rotating apparatus, 9: nozzle scanning apparatus, 10A, 10B: transfer rod, 11: support member, 12A, 12B: link, 13A, 13B: moving member, 16: high-pressure pump, 17: feed water hose, 21: control apparatus, 29: water supply apparatus, 40: computer.

What is claimed is:

1. An evaluation method of residual stress in a water jet peening, comprising:
   a first step of calculating internal pressure of a bubble, included in a jet flow jetting from a nozzle used for said water jet peening, and a bubble number density through jet flow analysis in which said jet flow is analyzed according to water jet peening execution conditions;
   a second step of calculating cavitation energy based on said internal pressure of said bubble and said bubble number density;
   a third step of calculating collapse pressure of said bubble based on said cavitation energy; and
   a fourth step of calculating said residual stress of a water jet peening object, on which to execute said water jet peening, based on said collapse pressure of said bubbles.

2. The evaluation method of residual stress in a water jet peening according to claim 1,
   wherein said calculation of said internal pressure of said bubble and said bubble number density in said first step is carried out by using said water jet peening execution condition under which said water jet peening was executed for said water jet peening object; and
   said calculation of said residual stress in said fourth step is calculation of said residual stress of said water jet peening object for which said water jet peening was executed.

3. The evaluation method of residual stress in a water jet peening according to claim 1,
   wherein said calculation of said internal pressure of said bubble and said bubble number density in said first step is carried out by using a jet flow analysis apparatus;
   said calculation of said cavitation energy in said second step is carried out by using a cavitation energy calculation apparatus;
   said calculation of said collapse pressure of said bubble in said third step is carried out by using a bubble collapse pressure calculation apparatus; and
   said calculation of said residual stress in said fourth step is carried out by using a stress analysis apparatus.

4. The evaluation method of residual stress in a water jet peening according to claim 1, comprising:
   a fifth step of deciding whether said calculated residual stress at a set depth from a surface of said water jet peening object is compressive residual stress; and
   a sixth step of storing, in a memory, values of said water jet peening execution conditions used to calculate said residual stress selected and then input, among said residual stress being compressive residual stress at said set depth and extracted in the decision in said fifth step,
   wherein said calculation of said internal pressure of said bubble and said bubble number density in said first step is carried out with different values of said water jet peening execution condition before said water jet peening is executed for said water jet peening object; and
   said calculation of said residual stress in said fourth step is carried out before said water jet peening is executed.

5. The evaluation method of residual stress in a water jet peening according to claim 4,
   wherein said calculation of said internal pressure of said bubble and said bubble number density in said first step is carried out by using a jet flow analysis apparatus;

said calculation of said cavitation energy in said second step is carried out by using a cavitation energy calculation apparatus;

said calculation of said collapse pressure of said bubble in said third step is carried out by using a bubble collapse pressure calculation apparatus;

said calculation of said residual stress in said fourth step is carried out by using a stress analysis apparatus; and said decision as to whether said calculated residual stress in said fifth step is compressive residual stress is carried out by a residual stress decision apparatus.

6. The evaluation method of residual stress in a water jet peening according to claim 1, wherein when said internal pressure of said bubble is $p_B$, said bubble number density is $n_g$, a volume of an analytical grid including said bubble with said internal pressure $p_B$ is $\Delta V$, a volume of an evaluated space is V, and a constant is $k_2$, said cavitation energy C is calculated from equations (1), and $$C = k_2 \sum_V \sum_i p_{Bi}^2 n_g \Delta V \quad (1)$$

said collapse pressure P of said bubble is calculated from equations (2)

$$P = Ln(-4E^{-17} \times C/23.97)/1.53 \quad (2).$$

7. A method of executing a water jet peening, comprising:

a first step of calculating internal pressure of a bubble included in a jet flow jetting from a nozzle used for water jet peening and a bubble number density before said water jet peening is executed for a water jet peening object, through jet flow analysis in which said jet flow is analyzed with different values of water jet peening execution conditions;

a second step of calculating cavitation energy based on said internal pressure of said bubble and bubble number density;

a third step of calculating collapse pressure of said bubble based on said cavitation energy;

a fourth step of calculating residual stress of said water jet peening object before said water jet peening is applied, based on said collapse pressure of said bubble;

a fifth step of deciding whether said calculated residual stress at a set depth from a surface of said water jet peening object is compressive residual stress;

a sixth step of storing, in a memory, values of said water jet peening execution conditions used to calculate said residual stress selected and then input, among said residual stress being compressive residual stress at said set depth and extracted in said decision in said fifth step;

a seventh step of inputting said values of said water jet peening execution conditions stored in said memory to a control apparatus for a water jet peening apparatus that executes said water jet peening for said water jet peening object; and a eighth step of controlling said water jet peening apparatus based on the values of said water jet peening execution conditions by said control apparatus.

8. The method of executing a water jet peening according to claim 7, wherein said values of said water jet peening execution conditions are values of an injection angle and an injection distance;

said control apparatus adjusts an angle formed by an axial center of said nozzle and a surface, of said water jet peening object, on which to execute said water jet peening, based on said injection angle; and said control apparatus adjusts a distance between an end of said nozzle being on an extension line of said axial center of said nozzle and said surface, of said water jet peening object, on which to execute said water jet peening, based on said injection distance.

9. The method of executing a water jet peening according to claim 7, wherein said calculation of said internal pressure of said bubble and said bubble number density in said first step is carried out by using a jet flow analysis apparatus;

said calculation of said cavitation energy in said second step is carried out by using a cavitation energy calculation apparatus;

said calculation of said collapse pressure of said bubble in said third step is carried out by using a bubble collapse pressure calculation apparatus;

said calculation of the residual stress in said fourth step is carried out by using a stress analysis apparatus; and said decision as to whether said calculated residual stress in said fifth step is compressive residual stress is carried out by a residual stress decision apparatus.

10. The method of executing a water jet peening according to claim 8, wherein said calculation of said internal pressure of said bubble and said bubble number density in said first step is carried out by using a jet flow analysis apparatus;

said calculation of said cavitation energy in said second step is carried out by using a cavitation energy calculation apparatus;

said calculation of said collapse pressure of said bubble in said third step is carried out by using a bubble collapse pressure calculation apparatus;

said calculation of the residual stress in said fourth step is carried out by using a stress analysis apparatus; and said decision as to whether said calculated residual stress in said fifth step is compressive residual stress is carried out by a residual stress decision apparatus.

11. The method of executing a water jet peening according to claim 7, wherein when said internal pressure of said bubble is $p_B$, said bubble number density is $n_g$, a volume of an analytical grid including said bubble with said internal pressure $p_B$ is $\Delta V$, a volume of an evaluated space is V, and a constant is $k_2$, said cavitation energy C is calculated from equations (1), and $$C = k_2 \sum_V \sum_i p_{Bi}^2 n_g \Delta V \quad (1)$$

said collapse pressure P of said bubble is calculated from equations (2)

$$P = Ln(-4E^{-17} \times C/23.97)/1.53 \quad (2).$$

* * * * *